US006858108B2

(12) United States Patent
Matthews et al.

(10) Patent No.: US 6,858,108 B2
(45) Date of Patent: Feb. 22, 2005

(54) MULTIPLE LAYER LABELS AND METHODS

(75) Inventors: Lowell F. Matthews, Los Alimitos, CA (US); Thomas P. Miller, Garden Grove, CA (US); Kyle J. Putzier, Anaheim, CA (US)

(73) Assignee: Ampersand Label, Garden Grove, CA (US)

( * ) Notice: Subject to any disclaimer, the term of this patent is extended or adjusted under 35 U.S.C. 154(b) by 82 days.

(21) Appl. No.: 10/039,684

(22) Filed: Dec. 31, 2001

(65) Prior Publication Data

US 2002/0084026 A1 Jul. 4, 2002

Related U.S. Application Data

(62) Division of application No. 09/266,638, filed on Mar. 11, 1999, now Pat. No. 6,413,604.

(51) Int. Cl.[7] .............................................. B32B 31/00

(52) U.S. Cl. ....................... 156/256; 156/514; 156/290; 156/293

(58) Field of Search ................................ 156/293, 256, 156/514, 290; 428/140, 137, 138, 139

(56) References Cited

U.S. PATENT DOCUMENTS 4,359,358 A 11/1982 Hattemer
4,621,837 A 11/1986 Mack
4,636,273 A * 1/1987 Wolfersperger ........ 156/244.11
4,711,686 A 12/1987 Instance
4,744,161 A 5/1988 Instance ...................... 40/638
4,744,591 A 5/1988 Instance
4,747,618 A 5/1988 Instance
4,991,878 A 2/1991 Cowan et al.
5,074,595 A 12/1991 Hill et al. ..................... 283/81
5,149,587 A 9/1992 Hill et al. ................... 428/354
5,234,735 A 8/1993 Baker et al. ............... 428/41.7
5,262,214 A 11/1993 Instance
5,324,559 A 6/1994 Brombacher ............... 428/40.1
5,342,093 A 8/1994 Weernink .................... 283/81
5,399,403 A 3/1995 Instance
5,439,721 A 8/1995 Pedroli et al. ............. 428/42.1
5,849,138 A 12/1998 Olson ......................... 156/522
5,863,628 A 1/1999 Barry
5,866,219 A 2/1999 McClure et al. ........... 428/40.1
5,944,357 A 8/1999 Instance
5,972,455 A 10/1999 Barry
6,057,019 A 5/2000 Barry

* cited by examiner

*Primary Examiner*—Linda Gray
(74) *Attorney, Agent, or Firm*—Wood, Herron & Evans LLP

(57) ABSTRACT

A process of making multiple layer labels includes securing an upper label web to a base label web by means of hold-down openings in the upper label web and an adhesive overlaminate laid thereon and extending through to the base web. Die cutting and matrix removal steps, all carried out in-line in a single pass, produce a multiple layer label. Varied processes and label supply and label structures are disclosed.

40 Claims, 15 Drawing Sheets

MULTIPLE LAYER LABELS AND METHODS

This application is a divisional of U.S. Ser. No. 09/266,638, filed Mar. 11, 1999 entitled MULTIPLE LAYER LABELS AND METHODS now U.S. Pat No. 6,413,604.

FIELD OF THE INVENTION

This invention relates to multiple layer labels and more particularly to new multiple layer label structures and methods of making such labels.

The field of multiple layer labels has been developed over quite a few years. There are many variations of label structures and production methods.

Where it is desirable to produce a multiple layer label having a base label and a discrete upper-label thereon, this structure complicates the automatic manufacturing process. For example, it is difficult to apply a series of discrete upper-labels on a moving base label web, or to move a base web having a plurality of discrete upper-labels thereon without having the upper-labels move, jam, fall off or otherwise lose "register" or place on the base label web.

Register of the upper-label on the base label web is important. That base label may have a "target" area for the placement of each upper-label with adjacent printing which should not be covered by a misaligned upper-label. Moreover, the alignment can be critical to further label components such as overlays, pocket formers, etc., which are applied presuming a particular site or location of the upper-label.

Accordingly, it is one objective of this invention to provide an improved, multiple-layer label structure having a base label and a discrete upper-label, and a process of forming such a label structure, including the formation of a series of discrete upper-labels on a web of base labels without loss of register of the upper-labels on that web during the process.

Additionally, current methods for producing multiple layer labels often necessitate the use of multiple "passes" through one or more pieces of equipment which can adversely affect efficiencies, waste, and even quality.

Accordingly, it is another objective of this invention to allow the entire production process to be completed in one "pass" through a relatively standard label converting press with only modest modifications or additions. As such, production could be performed by many preexisting label presses appropriately modified. The "single press pass" aspect of the invention can translate into reduced costs for an important segment of the packaging industry.

Additionally, where current production methods do allow for a "single press pass" to make a multiple layer label with leaflets, the use of an in-line "plow folder" is normally the method of choice. Unfortunately, this method can only generate fold lines longitudinal to the web. The resultant finished labels, when applied to round bottles using standard label application machinery configurations, will not perform properly. Specifically, the fold lines thus made will extend around the bottle curvature, thereby defeating the needed hinging properties of the fold evidenced when it is, for example, flat.

Accordingly, it is one objective of this invention to allow for the production of multiple layer labels where the upper label can be multi-leafed with either no hinged folds ("loose sheets"), or to allow for hinging transverse to the web along a straight hinge line. This will enable the use of standard label application machinery configurations to apply multi-leafed labels with no fold ("loose sheets"), or alternatively, a hinge mechanism vertically positioned on round bottles.

Additionally, the current methods of producing multiple layer labels often are restrictive in either the number and/or the positioning of the upper label(s) on the base label.

Accordingly, it is one objective of this invention to allow for the production of multiple layer labels which can be disposed in a variety of positions and/or quantities on a single base label.

In yet another aspect of the invention, where removable upper-labels are used, it is desirable they be easily removable. Yet when overlaminates are used over the removable upper labels, removal is frequently difficult. It is thus desirable to provide an improved multiple layer label including a base label, an upper-label and an overlaminate where the upper-label and laminate are at least partially releasable from the base label by means of an improved label tab structure facilitating label removal and, when desirable, can be prepositioned back onto the base label.

In yet another aspect of this invention, it is sometimes occasionally desirable to surround the upper label with an overlaminate so the upper-label has all its longitudinal edges overlapped and protected by the overlaminate. This helps prevent upper label edge damage, premature label removal and the like. Nevertheless, use of an overlaminate, overlapping all label edges hinders upper label removal. It is thus a further objective of the invention to provide a label structure and a method wherein the upper label is at least substantially overlapped on at least its longitudinal, machine-direction edges, with an overlaminate holding it to the base, while still retaining leading and forward edge hold-down of discrete upper labels on a moving base web during a portion of the label production process. Also, it has been an objective of the invention to render such an upper label easily removable from the base.

It is also recognized that in some instances, it is desirable to produce a multiple layer label wherein a discrete upper label is provided on each of a series of base labels and where a coextensive or overlapping overlaminate, which might otherwise secure the upper labels, is not applied until late in the process, if at all. Accordingly, it has been another objective of the invention to provide an improved label structure and process wherein discrete upper labels are applied and held to a moving base label web without displacement of the upper labels and before any overlaminate covering the entire upper label is applied, if at all.

To these ends, the invention contemplates in one embodiment, a label structure including a base stock material comprising base label material, an adhesive and a liner of indeterminate length covering the adhesive. A discrete, removable upper label is disposed on top of the base label, held there by an overlaminate of preferably clear film. For example, leading or forward edges of overlaminate overlap the upper label, holding it to the base. At one end, the over-laminate defines a tab extending from the upper label and a stiffening layer attached at an underside of the tab, spaced from the upper label, to facilitate lifting of the tab and label removal.

In a process for making such a label, a web defining a series of upper labels of one or more layers is unwound and provided with a series of transverse pairs of hold-down openings overlapping areas which will be respectively the trailing area covering what will be the trailing end of the base label and the leading end of the next base, on the one hand, and, on the other hand, the area at the forward end of the upper-label. An adhesive film or overlaminate is applied over the upper label web with adhesive exposed downwardly in the transverse openings. This multiple layer web is joined with a base label web, with the adhesive overlaminate film holding the upper label web on the base web through the openings. Thereafter, the upper and base labels, including their respective webs, are held in precise register through the removal of the waste matrix and termination of the process.

The webs are run through a die which cuts the upper label down to the base web. A tab is defined in the overlaminate at preferably the leading edge of the upper label (it could be the trailing edge) and overlaying a portion of upper label web matrix material. At a position spaced across the opening from the upper label's leading edge, the overlaminate tab covers a small piece of web material which lies thereunder during matrix removal. A stiffened tab having a stiffening layer is thus provided to facilitate grasping and removal of the upper label.

In use, the tab is grasped and lifted, peeling away with it the upper label and the overlaminate. The exposed portions of the adhesive overlaminate is lifted away from the base label and permits lifting the upper label whose other end is also removably held on the base by the film. The upper label can be left hinged to the base label or can be completely stripped off. The "hinged version" of the upper label can be rejoined to the base label via the exposed adhesive position of the laminate. This provides for multiple uses of the same label.

In another embodiment, a similar upper label web with transverse openings is provided and a narrow hold-down tape with preferably a central non-adhesive area is disposed thereon longitudinally. This tape holds the upper label web down, through the openings, onto a base label web and thus registry through the process is assured. Thereafter, an overlaminate may be applied as well. The central non-adhesive portion facilitates lifting of the label tab which is formed in the over-laminate, if and when applied, the tape cooperatively stiffening the tab for easy grasping and removal.

The upper label webs are die cut to appropriate shape of the upper label. In use, the upper label can be easily removed by lifting the tab and the overlaminate and hold-down tape away from the base label after it is applied to a product. Die cuts in the upper label, overlaminate and hold-down tape facilitate and define the areas of the upper label which is removable.

In this embodiment, the hold-down tape may be applied along a longitudinal, machine direction side of the upper label where removal tabs extend transversely so the labels are still held in register, yet the side tabs are strengthened for grasping and easy removal.

In this way, discrete upper labels can be disposed on and formed on a moving base web in precise register with the overlaminate or hold-down tapes holding the upper labels on the base by virtue of the openings in the upper label web, whether single or multiple layer. This eliminates the difficulty of securing discrete upper labels on moving substrates of base labels.

These and other objectives and advantages will become even clearer in the following detailed written description and from the drawings, in which.

Figure 1:
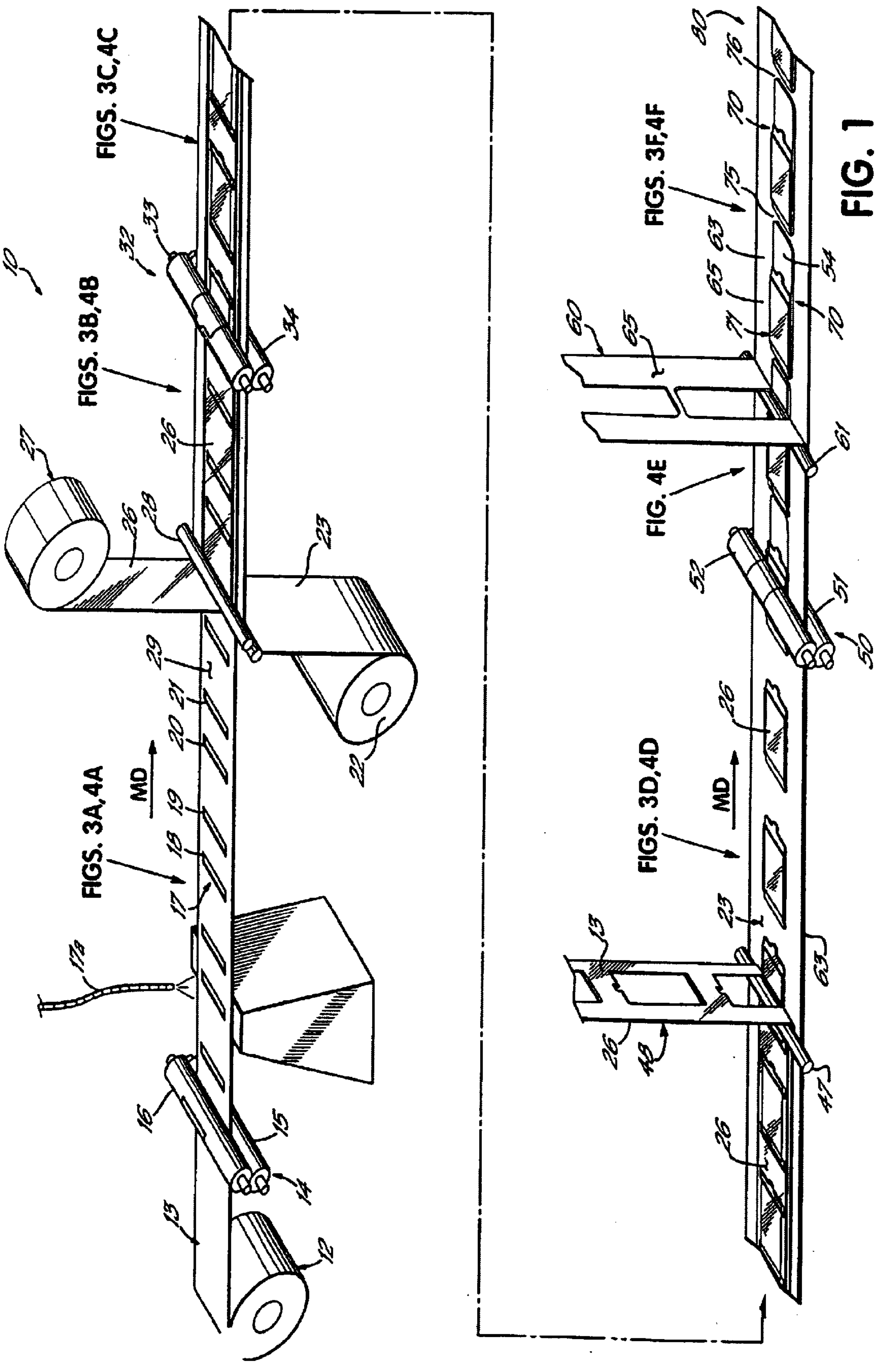
FIG. 1 is a schematic illustration of the process of making a preferred multiple layer label according to the invention.

Turning now to the drawings, there is indicated at 10 in FIG. 1 a schematic diagram of a process according to the invention, for making multiple layer labels. The process 10 is carried out, preferably on a printing apparatus or press, shown at 11 in FIG. 2.

Figure 2:
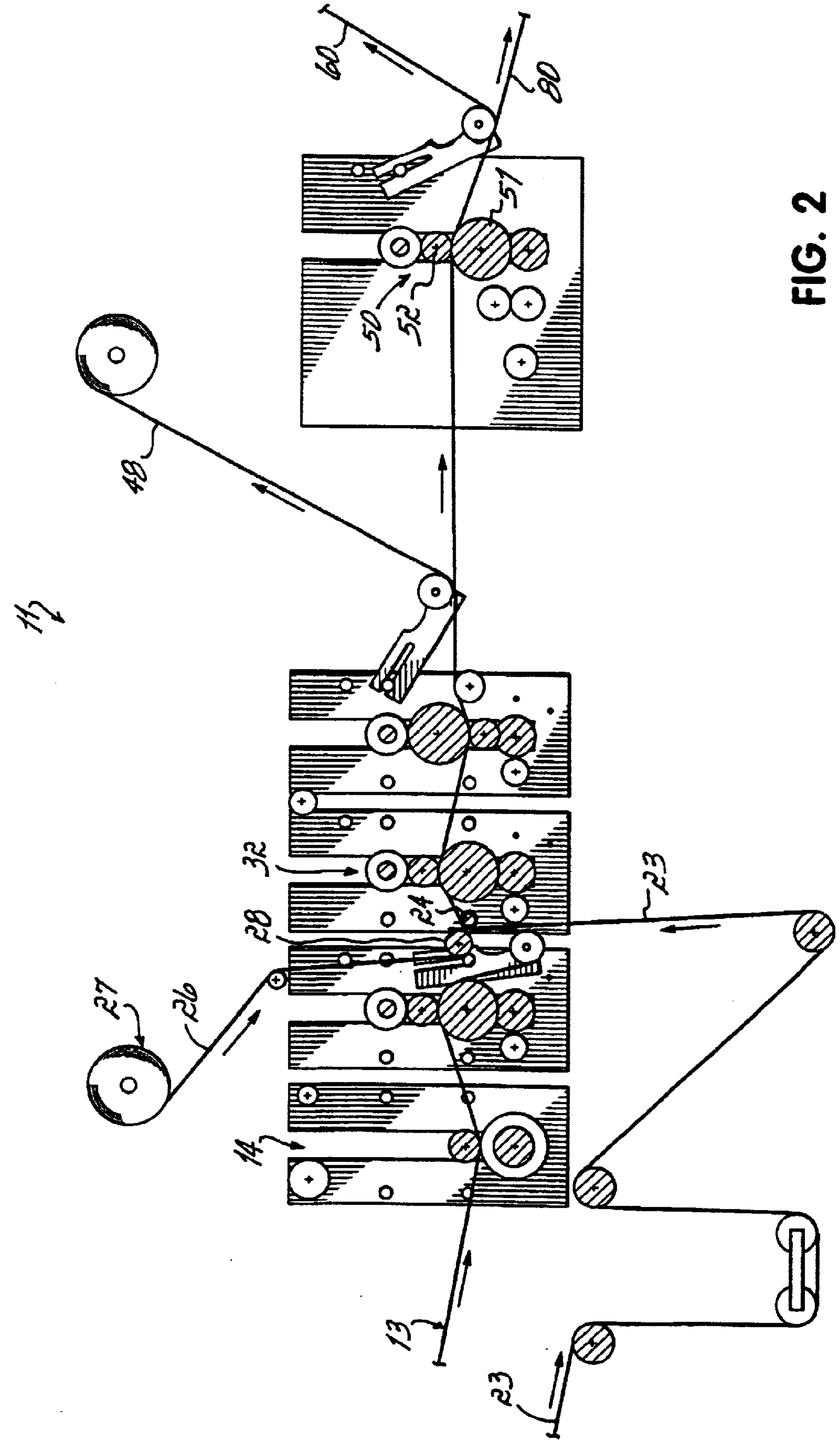
FIG. 2 is a diagram of a single-pass press webbed or threaded to produce the label according to the process of FIG. 1.

The press 11 diagrammatically illustrated in FIG. 2 is a typical printing press, such as the model Prime Flex Series sold by the Roto Press Company. While any suitable press can be adapted to carry out the process of the invention, as will be readily apparent to one of ordinary skill in the art, the Roto Press apparatus has proven useful in carrying out the process.

It will be appreciated that, in carrying out the process of the invention, the various presses can be modified or adapted and threaded with various webs and takeoffs according to the invention to produce the process as described herein. For example, if desired, certain plow folders can be used to produce a multiple layer upper label as described herein. Various waste takeoff rollers and idler rollers may be added or adjusted to the press as well, and as illustrated in FIG. 2. It will be appreciated that the press itself constitutes no part of the present invention.

In a preferred embodiment, the process, according to the invention, is best understood from a review of the schematic illustration in FIG. 1. FIG. 2 shows how the press 11 is webbed or threaded to produce the process illustrated in FIG. 1.

FIGS. 3A–3F disclose the various stages of the web in plan view as it moves through the various stages of the process illustrated in FIG. 1 and FIG. 2.

FIGS. 4A–4F are respective cross sections of FIGS. 3A–3F.

Figure 5:
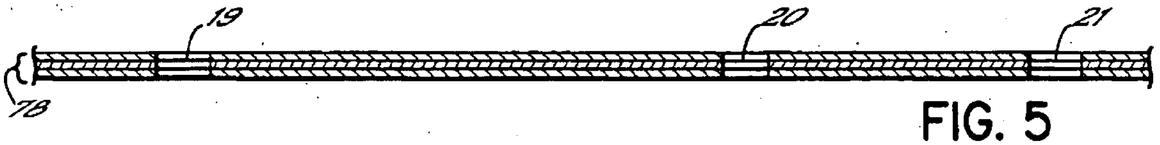
FIG. 5 is a longitudinal cross-sectional view similar to FIG. 4A but showing a multiple layer upper label.
Figure 6:
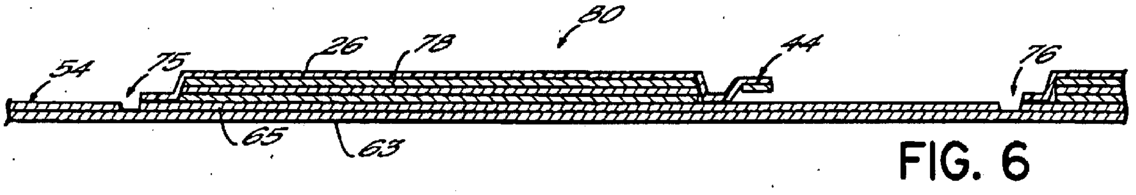
FIG. 6 is a longitudinal cross-sectional view similar to FIG. 4F but showing the entire label structure where the upper label is a multiple layer label such as that of FIG. 5.

FIGS. 5–6 illustrate a modification of the invention where the upper label is actually, in itself, multiple layers.

Figure 7:
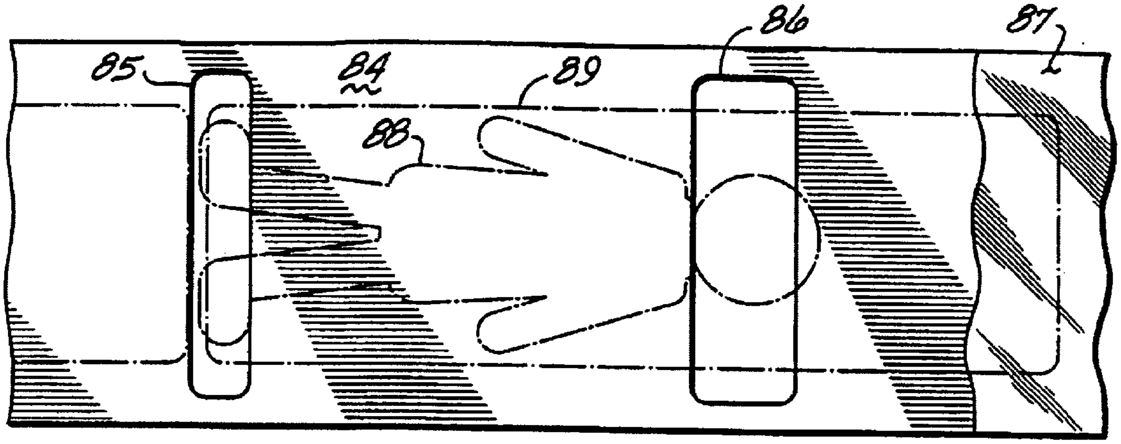
FIG. 7 is a plan view of an alternate multiple layer label made by the process of FIG. 1 but where the upper label is to be a fanciful shape.
Figure 8:
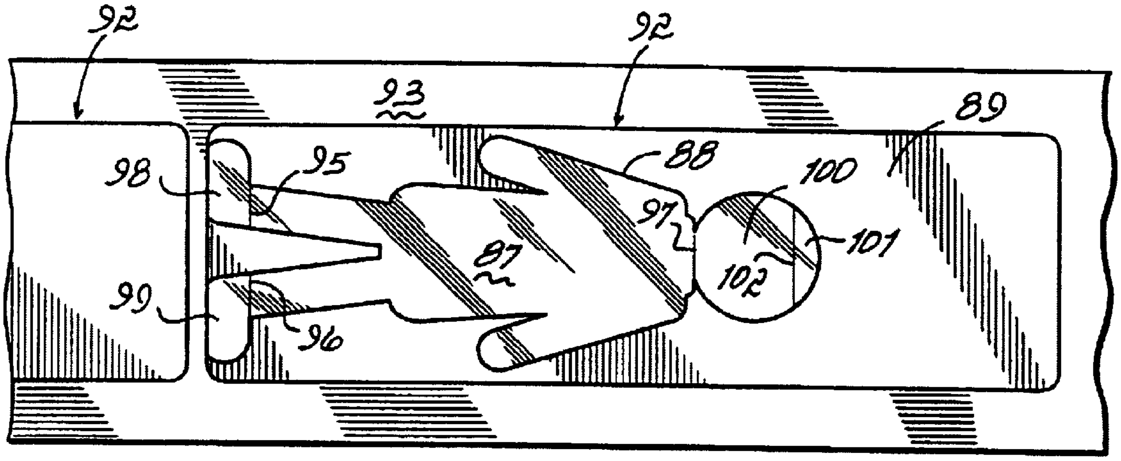
FIG. 8 is a plan view of the finished multiple layer label of FIG. 7.

FIGS. 7 and 8 illustrate another feature of a preferred embodiment of the invention, where the upper labels are in fanciful format or shape.

Figure 9:
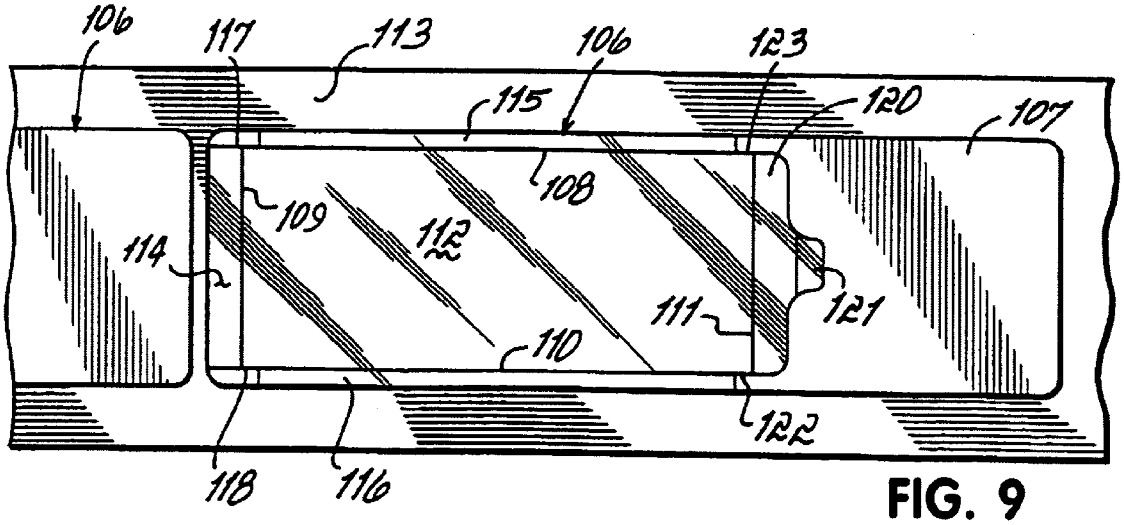
FIG. 9 is a plan view of another multiple layer label made by a process similar to that of FIG. 1 wherein the upper label is substantially overlapped about its periphery by the overlaminate.
Figure 10:
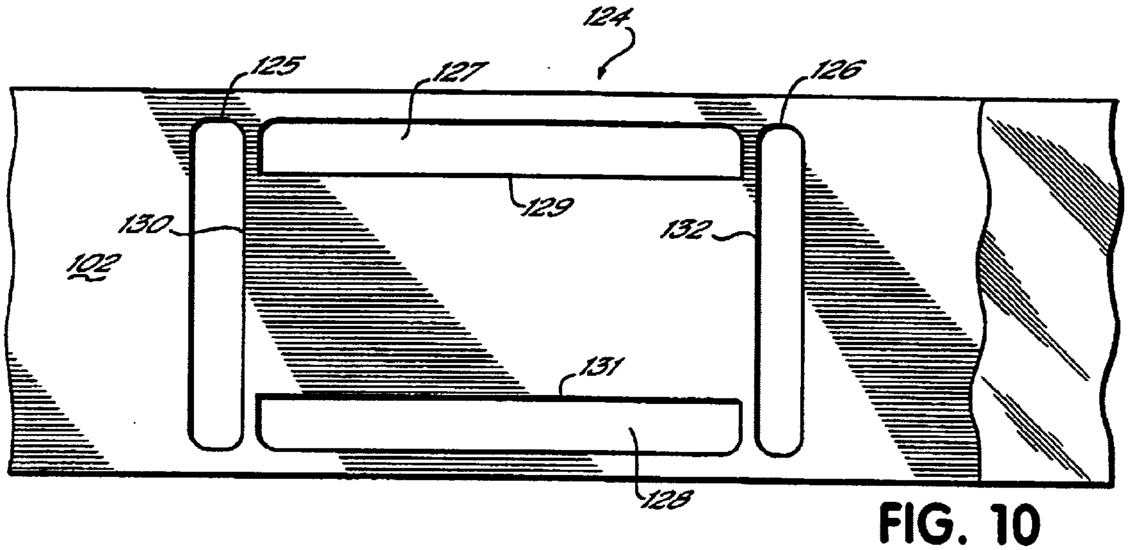
FIG. 10 is a plan view further illustrating a portion of the process used in making the label of FIG. 9, wherein four openings are defined in the upper label web.
Figure 11:
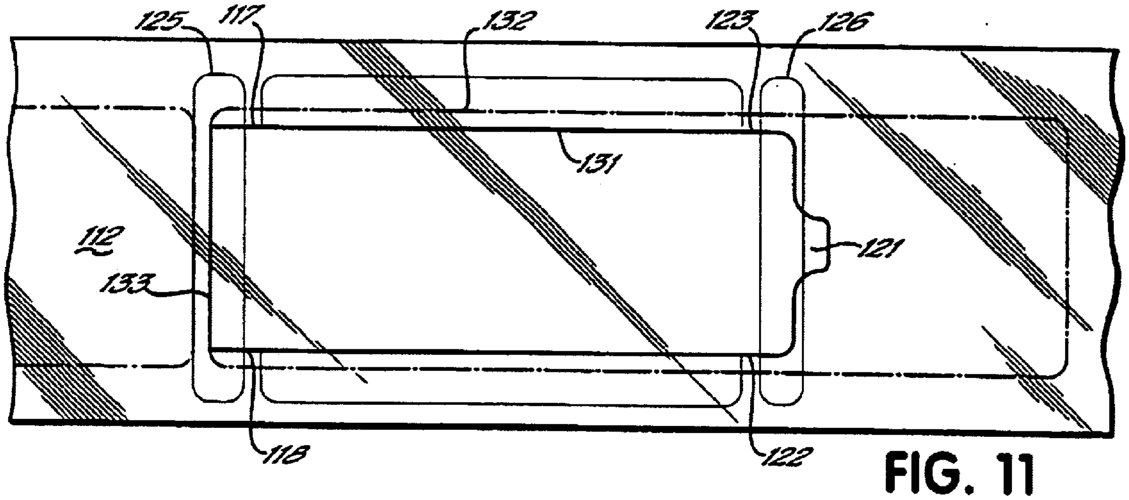
FIG. 11 is a plan view showing the shape of the upper label of FIG. 9 in register with the openings of the upper label web.

FIGS. 9, 10 and 11 demonstrate yet another feature of a preferred embodiment of the invention where the overlaminate actually overlaps the upper label substantially around its periphery.

Figure 12:
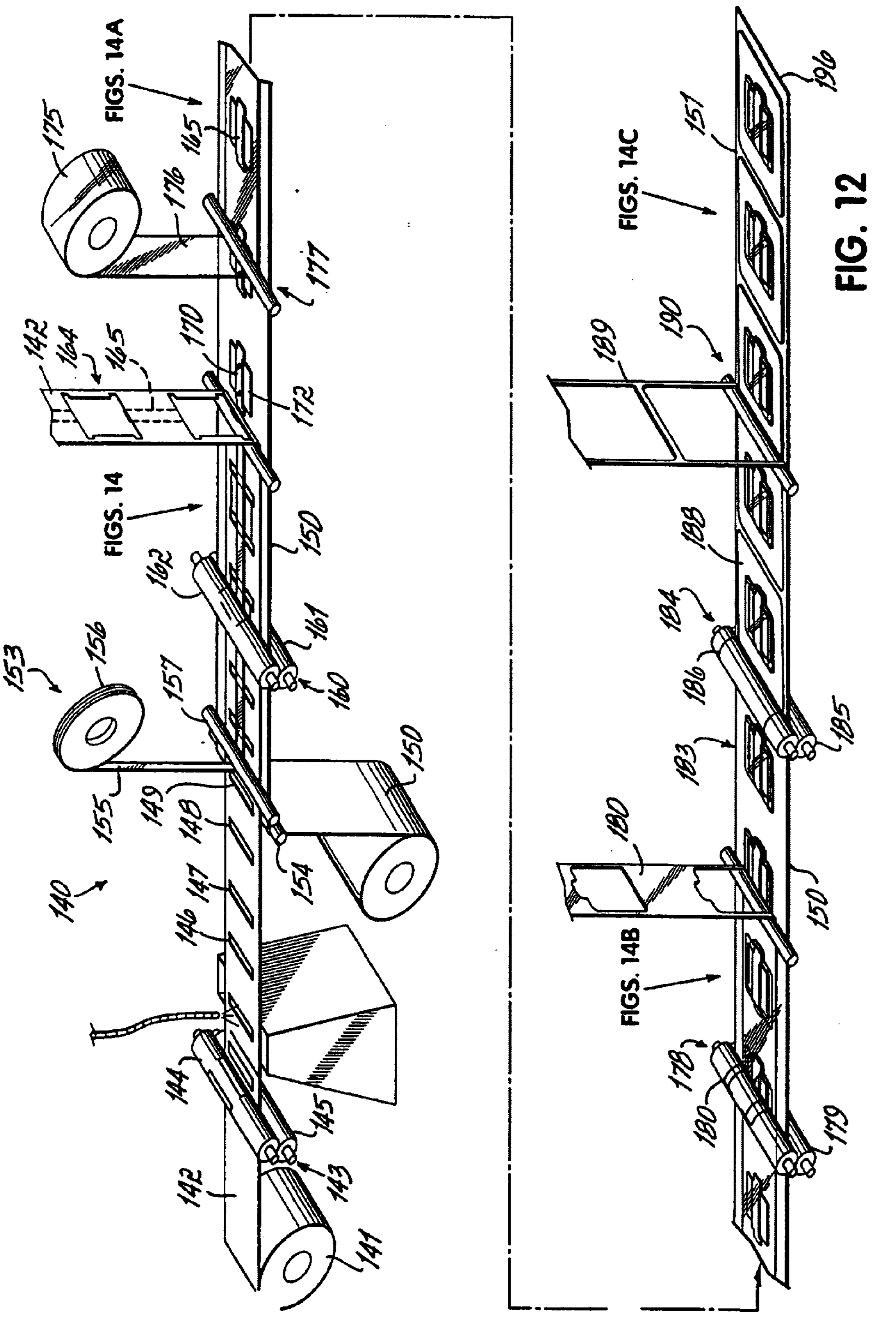
FIG. 12 is a schematic illustration of another embodiment of the invention wherein a narrow tape is used to hold the upper labels on the base label web prior to coverage with a clear overlaminate, if one is used at all.
Figure 13:
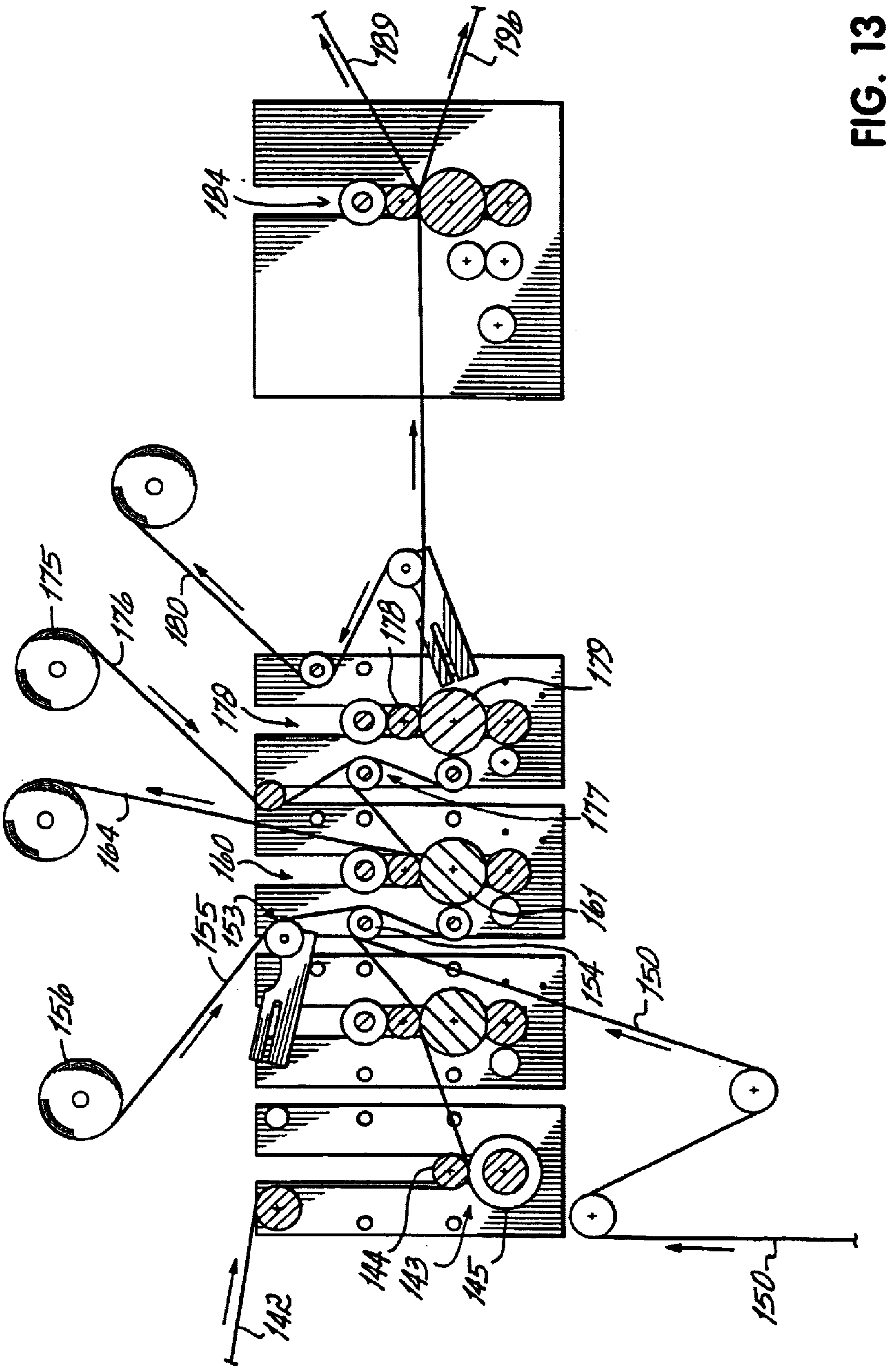
FIG. 13 is a diagram of a single pass press webbed or threaded to produce the multiple layer label according to FIG. 12.
Figure 14:
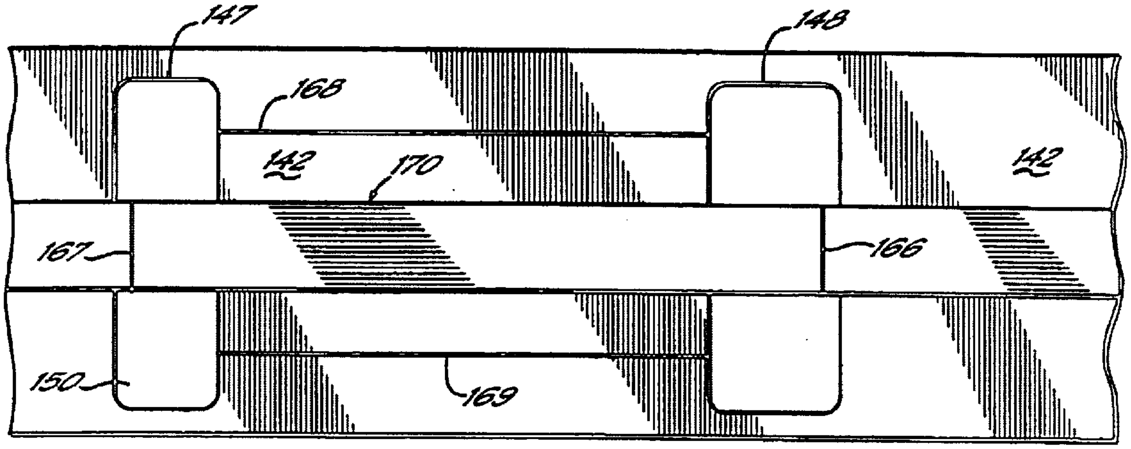
FIG. 14 is a plan view of an alternate upper label web according to the process illustrated in FIGS. 12 and 13, wherein a narrow hold-down strip is used to secure a first upper label web to a base web before final definition of the label and with preliminary cuts in the first web and hold-down tape.
Figure 14A:
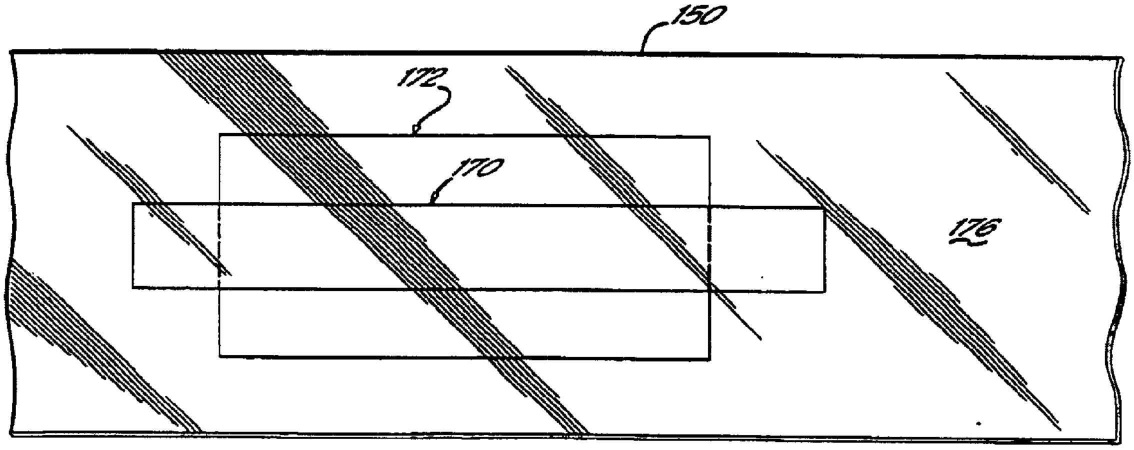
FIG. 14A is a plan view of the web of FIG. 14, now covered with an optional overlaminate.
Figure 14B:
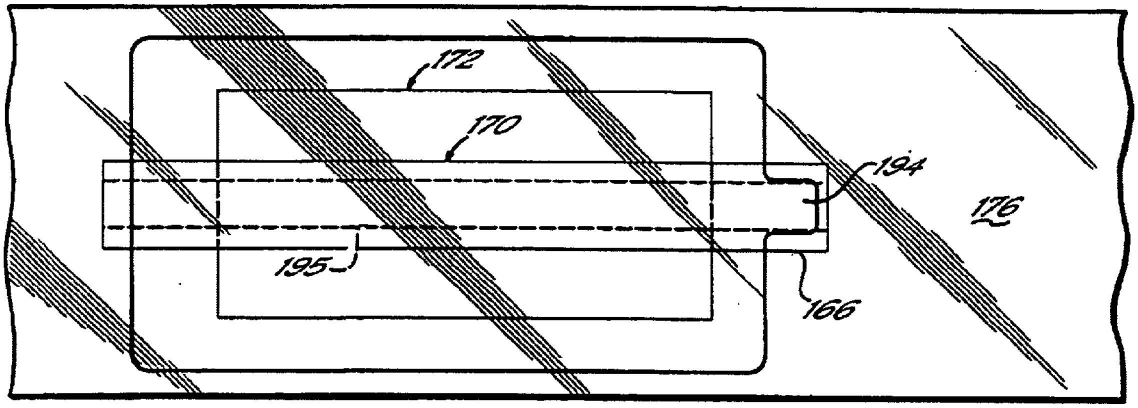
FIG. 14B is a plan view of the web of FIG. 14 and FIG. 14A, with die cuts having been made in the overlaminate.
Figure 14C:
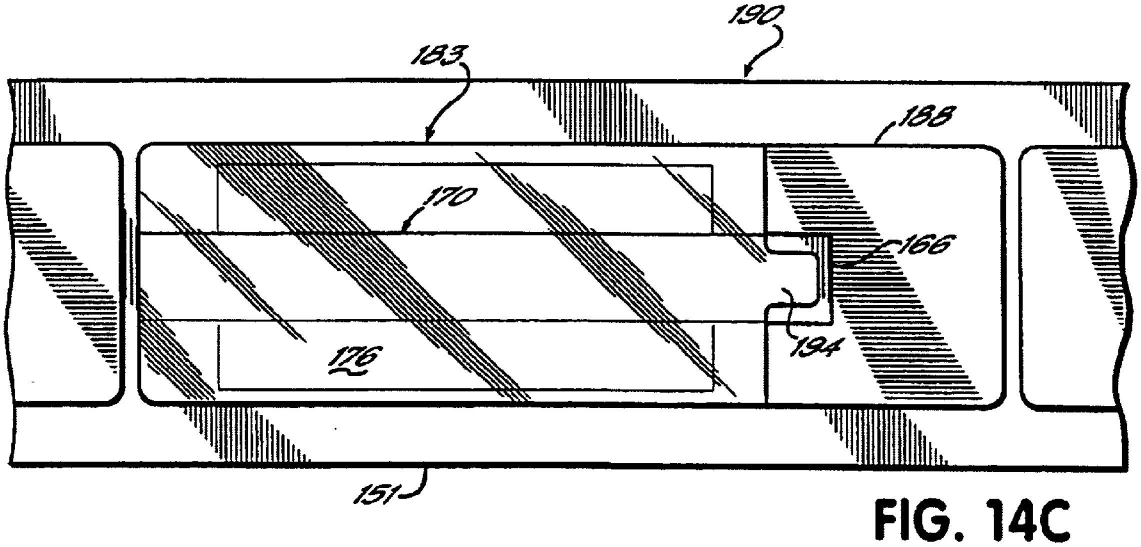
FIG. 14C is a plan view of the finished multiple layer labels on a carrier web.

An alternate embodiment is shown in FIGS. 12–14. FIG. 12 is a diagrammatic depiction of the alternative process; FIG. 13 is a press diagram showing how the same press as described above can be used in the alternate process; and FIGS. 14–14C are top plan views of a label or label supply as produced by the process shown in FIGS. 12 and 13. FIGS. 15–19 illustrate various label formats produced by the process of FIGS. 12–13.

FIGS. 20–24 illustrate further variations of this invention.

Returning now to FIGS. 1 through 4F, the process and the label will be described together. For clarity, it is perhaps best suited to describe the process as shown in FIGS. 1 and 2 with reference to the label structure shown in FIGS. 3A–3F and FIGS. 4A–4F. Arrows on FIG. 1 indicate the areas represented in FIGS. 3A–3F and 4A–4F respectively.

Accordingly, turning now to FIG. 1 and the process 10, it will be appreciated that a supply 12 of a first upper web 13 is shown at the upper lefthand corner of FIG. 1. It will be appreciated that this web and the base label web to be described has preferably been preprinted in a prior print station in the same pass through the press. This preprinting process is preferably common to all the processes and structures described herein. That supply, as unwound in web 13, is directed to a first die station 14,where two rollers 15, 16, at least one of which is outfitted with a cutting blade, serves to cut a series 17 of transverse openings through the web 13. Thereafter, a blower apparatus 17*a* serves to blow any remnant remaining in the opening through the web, so that the openings are clear. Vacuum could be used.

Continuing downstream, it will be appreciated that a series of transverse openings are thus supplied in web 13. Two series 17 of such openings, for example, are shown at 18, 19, 20 and 21. It will be appreciated that the distances between the openings 19 and 20 is greater than the distance between the openings 20 and 21. For further reference, the upper label layer will primarily be formed, at least in the embodiment to be described, in that area between the openings 19 and 20.

It will also be appreciated that the base label, which has not yet been combined with the web 13, will eventually take shape and be formed essentially between the openings 19 and 21, for example. Thus, in the embodiment to be described, a multiple layer label will be formed with an upper label layer relatively shorter than the eventual base layer in the machine direction MD.

Figure 3A:
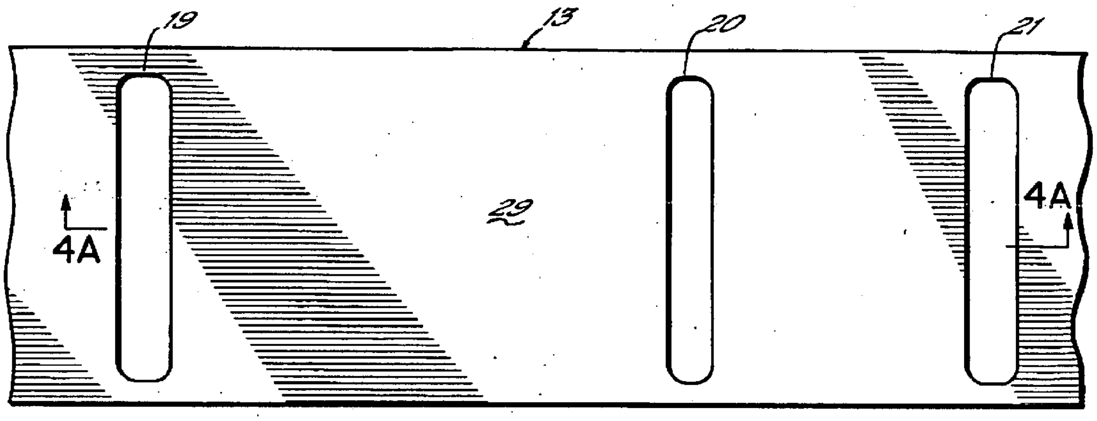
FIGS. 3A–3F are diagrammatic plan views of label components as the label, according to the invention, is made by the process of FIG. 1.

At this point in time, that is between the die station 14 and position downstream of the opening 21, the upper label layer takes on a configuration as best seen in FIG. 3A in plan view.

Thereafter, at a combining station, two things essentially occur simultaneously. First, as diagrammatically shown in FIG. 1, a second web supply 22 of a base label web material 23 is unwound and directed over a turn roller 24 into combination with, and against the underside of, the first web 13. Thus, at this station defined in part by the roller 24, the base label web 23 is combined with the upper label web 13. In the press, FIG. 2, the two webs are actually combined about small diameter roller 24 which biases the layer into a preset, slight curved condition (not shown) for adapting the labels to application on a curved surface.

At about the same time or just immediately after that combination, an overlaminate web 26 is unwound from the supply 27 and is run beneath the roller 28 so that it contacts the upper surface 29 of the first web 13.

It will be appreciated that the overlaminate 26 preferably comprises a clear film which has a lower adhesive side, so that when it is combined with the upper surface 29 of the web 13, it sticks thereto.

Figure 3B:
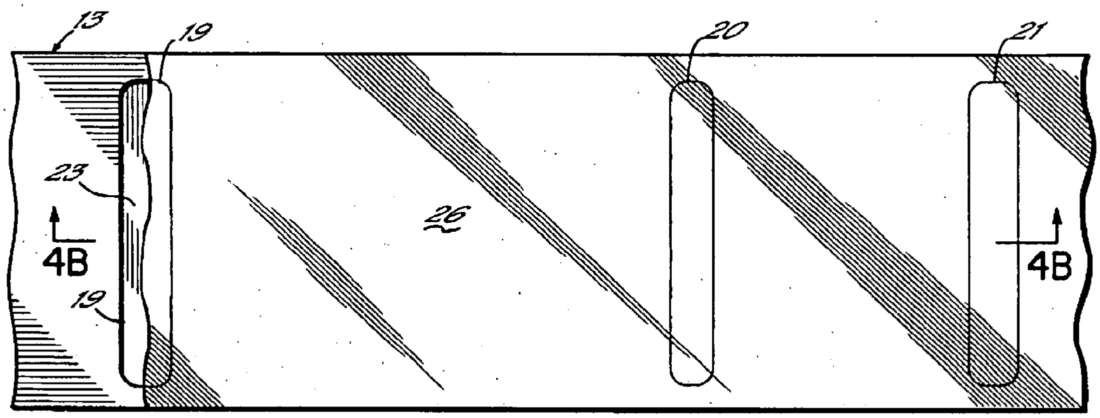
Figure 4A:
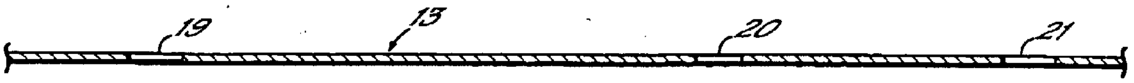
FIGS. 4A–4F are respective longitudinal cross-sections taken along the sectional lines in the respective FIGS. 3A–3F.
Figure 4B:
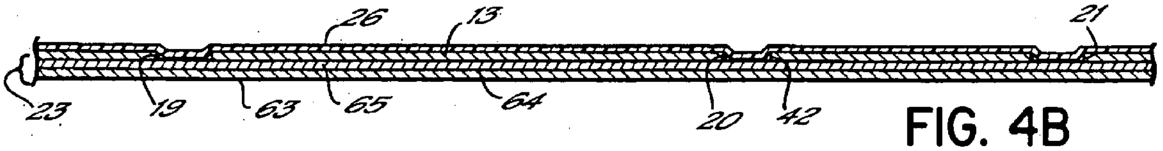

Moreover, it will be appreciated that the overlaminate 26 also adheres to the base web 23 by virtue of extending through the series 17 of hold-down openings, such as openings 18, 19, 20, 21, for example, as they move downstream of the roller 28 (see FIGS. 3B and 4B). Accordingly, the series 17 of openings, including such openings as at 18–21, are referred to as hold-down openings.

This adhesion, as will be appreciated, maintains the two webs 13 and 23 in direct and immovable contact with respect to each other. Thus, the web 13 is held in a direct registry with respect to the web 23.

At this point, the nature of the webs is of interest. The first web 13 can be a single layer label material of any suitable type, or it could be made of multiple layers. If made of multiple layers, it has been found suitable to run the web 13 through a plow folder, which would plow longitudinal folds into the web, such as at two different longitudinal dispositions, to create a tri-level or three layer upper label with the fold lines running longitudinally or in a machine direction. These would eventually be trimmed so that the upper label would in fact comprise three label layers (FIGS. 5 and 6).

FIG. 3B illustrates in plan view of the composite web, a portion which is broken away. The status of the composite material, after the two webs 13 and 23 have been joined, is held together by the overlaminate 26. In FIG. 3B, the lefthand end of the overlaminate 26 is broken away in the area overlying the hold-down opening 19. It will be seen that the underlying base web 23 is visible and accessible for adhesion through the opening 19.

After the webs have been joined, as described, they are further conveyed to a second die station 32 (FIG. 1) comprising rollers 33 and 34, which serve to die cut a label shape in both overlaminate 26 and in the upper label layer 13. This is illustrated in FIG. 3C, where the hold-down openings 19, 20 and 21 are still visible through the clear overlaminate material 26.

Figure 3C:
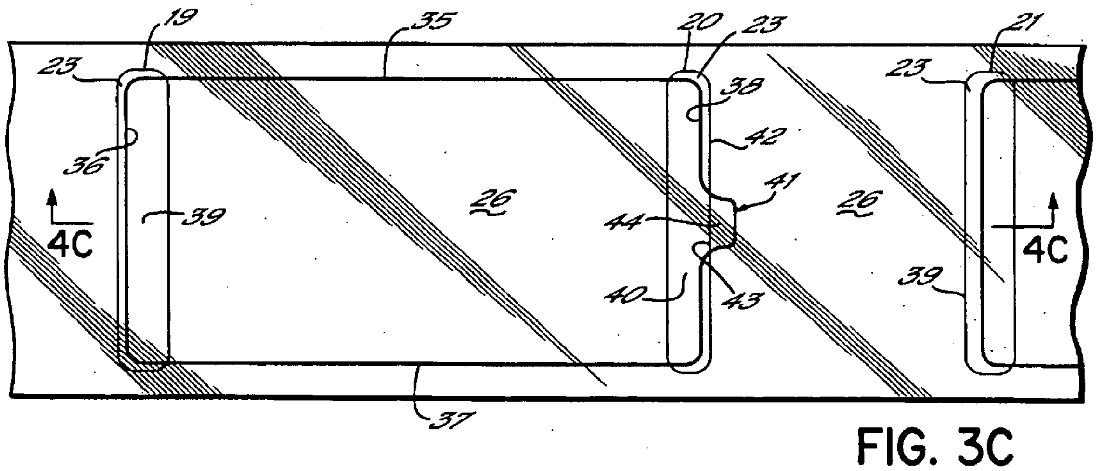
Figure 4C:
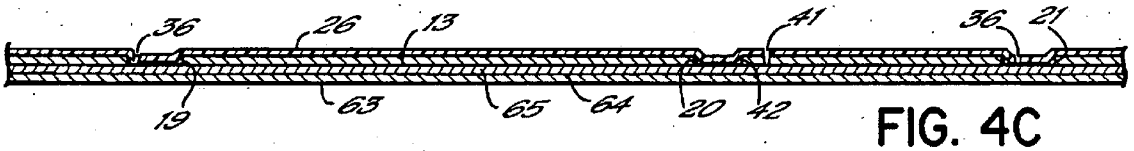

From FIGS. 3C and 4C, it will be appreciated that at die station 32 (FIG. 1), a cut is scored through the overlaminate 26, as indicated by the lines 35, 36, 37 and 38. It will be appreciated that the lines 35 and 37 are cut by the die station 32 through both the overlaminate material and the underlying upper label layer 13. However, since the cuts extend through the areas indicated at the hold-down holes 19 and 20, it will be appreciated that the actual cut through the underlying upper label web 13 is at line 35, between the closest edges of the respective hold-down openings 19 and 20, and also along parallel cut line 37 between the closest parallel edges of the respective hold-down openings 19 and 20. Thus, the underlying label takes on a rectangular shape in the web 13.

At the same, the cuts 36, 38 are formed in overlaminate material in the areas of the hold-down openings 19, 20, where the overlaminate material engages the underlying base label layer material or web 23.

Thus, it will be appreciated that the areas 39 and 40 in FIG. 3C are areas of the clear overlaminate 26 which extends through the hold-down openings 19 and 20 respectively, and are secured to the base web or base label layer represented by the web 23. At this point in time, of course, the base web 23 is unbroken.

Moreover, it will be appreciated that a portion 41 of the cut line 38 extends forwardly of the forward edge 42 of the opening 20, to cut out a small portion represented by the lines 43 and intersecting lines 41 of the first web or upper label layer material 13, and that the overlaminate material 26 extends over this area and is defined by the forward cut lines 38 and 41.

Thus, a tab 44 is formed between the lines 43 and 41 as shown. This tab is a multiple layer tab comprising an upper layer of the clear film overlaminate 26 and a lower layer of the first web or upper label layer material 13. Then, the die cut composite structure is conveyed to a separation station represented by the roller 47 where matrix 48 is pulled off the composite structure.

Figure 3D:
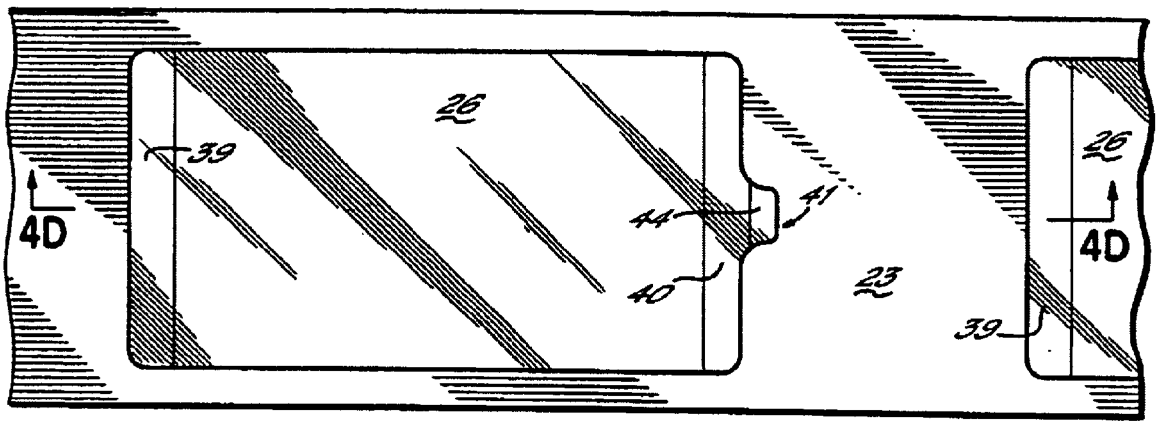

The matrix 48 comprises a combination waste matrix of both overlaminate material 26 and upper label layer 13 and represents that area outside the die cut pattern provided in the web at the die station 32. The condition then, of the web downstream of the separation station 47 after the matrix 48 has been removed, is shown in FIG. 3D in plan view. A plurality of overlaminated upper labels lie on the base web 23.

Figure 3E:
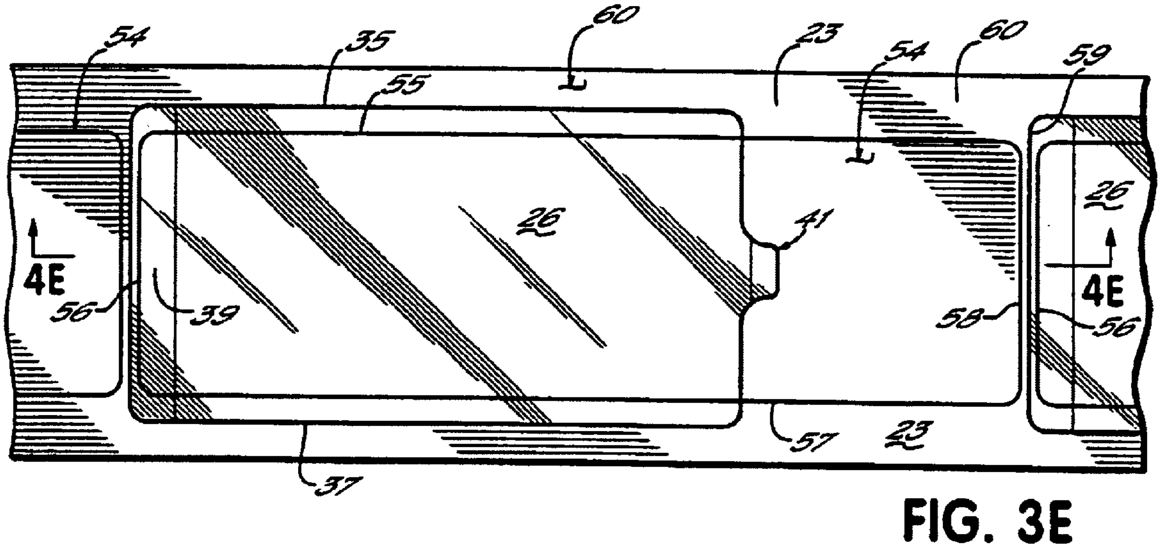
Figure 3F:
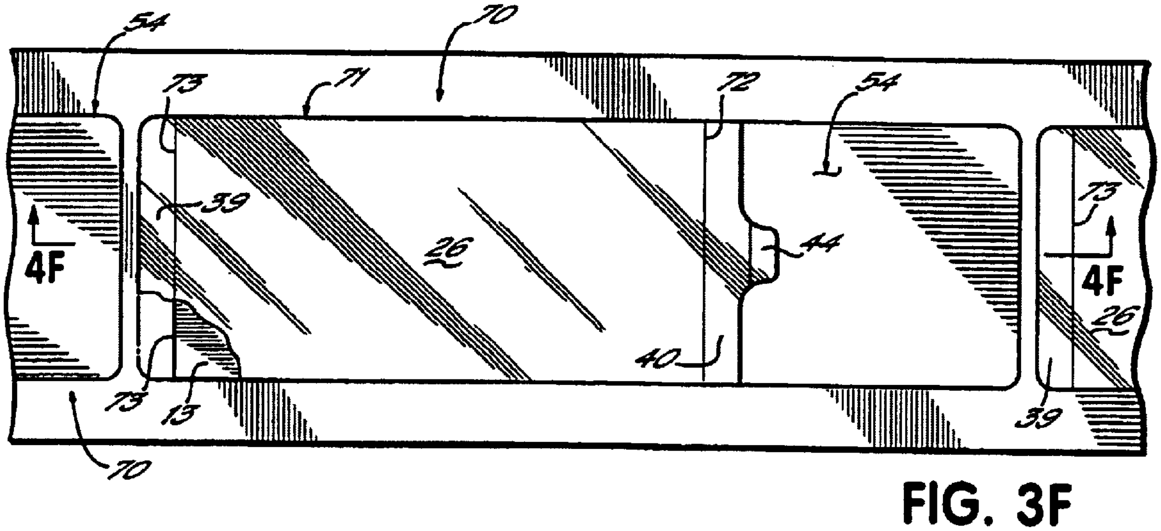

Moving forwardly downstream in the machine direction, the web is next engaged at the cutting station 50, comprising die rollers 51 and 52. At this die station, the shape of the base label layer is cut into the web 23. Thus, as shown in FIG. 3E, a base label shape 54 is cut into the web 23, as demonstrated by the lines 55, 56, 57 and 58. It will be appreciated that the line 58 is coincidentally coextensive with the rear or trailing edge 59, of where the hold-down hole 21 had been in the upper web 13.

It will also be appreciated that the cut lines 55 and 57 are interior of the cut lines 35 and 37, which define and comprise the longitudinal edges of the upper label, which is still covered by the overlaminate 26.

Thereafter, a matrix 60 is removed at a separation station identified at the roller 61. Matrix 60 comprises the upper label layer material of the web 23, leaving the liner 63. Also, it will be appreciated that the matrix 60 is a composite or combination and also carries with it portions of the overlaminate 26 and portions of the upper label layer 13, which had been cut through by the lines 35 and 37.

Once this matrix 60 is removed, there is left a plurality of discrete label structures 70 carried on the liner 63. These label structures are shown in plan view in FIG. 3F and comprise the base label 54 and the upper label 71, which comprises the overlaminate 26 and the upper label layer thereunder, defined by the forward and trailing edges 72, 73.

It will be appreciated that the overlaminate 26 extends over the respective leading and trailing edges 72 and 73. For example, at the edge 73 of the upper label layer 13, there is an area 39 of the clear overlaminate which attaches to the underlying base label 54. Also, at the area 40, the clear laminate 26 attaches to the base label 54.

On the other hand, the area represented by the tab at 44 is not adhered to the underlying base label. Instead, it will be appreciated, at this point, that the clear laminate 26 overlies a portion of material which was cut, as illustrated in FIG. 3C, from the upper label layer material before that matrix was removed.

Thus, the tab 44 may be easily lifted so that the laminate 26 can be released throughout the area 40 from the base label and the underlying upper label, that is under the laminate 26, can be lifted away from the base label 54. This label can be completely removed by lifting away the area 39 of the overlaminate 26 from the base label 54, or that area 39 can serve as a hinge for the opening and closing of the upper label 71, away from and onto the base layer 54.

In order to facilitate the removal of label 71, the base label 54 could be precoated or patterned with a release material, such as a UV-cured varnish in areas underlying the overlapping overlaminate.

It will be appreciated that a series of label structures 70, each including a base label 54 and an upper label 71, including an upper label layer and the overlaminate 26, are provided on the liner 63 in seriatim, and that each of the upper labels 71 is held in a predetermined register in a target area on the base label 54.

For further understanding of this invention, a comparison is now made between FIGS. 3A–3F and respective FIGS. 4A–4F. Each of the FIGS. 4A–4F is a longitudinal cross-section of the web as it moves through the process and corresponds to respective FIGS. 3A–3F.

For example, in FIG. 4A, there is shown a longitudinal cross-section of FIG. 3A, where the upper label layer 13 is shown, provided with openings, such as the openings 19, 20 and 21.

In FIG. 4B, there is shown a cross-section of the label construction illustrated in FIG. 3B after the upper web 13 has been combined with the base layer or web 23. Of course, the base layer or web 23 includes the liner 63, a layer of adhesive 64 (not shown) and a base label layer 65, such as illustrated in FIG. 4B. Also, it will be appreciated that the upper laminate 26 has been added to the top of the upper label layer 13 and extends through the holes to engage the base label layer 65 of the web 23.

Turning now to FIG. 4C, which is a longitudinal cross-section of the label structure as shown in FIG. 3C, the die cuts have now been made in labels. The transverse cuts thus, for example, 36 and portion 41 of cut 38, are illustrated in the FIG. 4C.

Figure 4D:
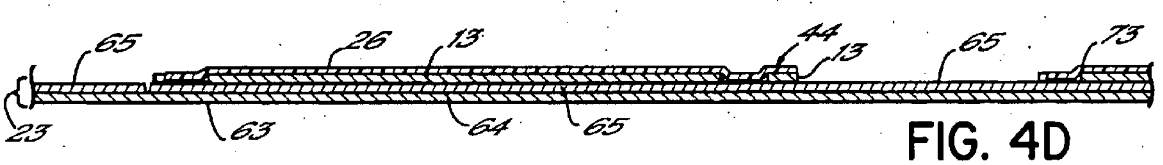

Turning now to FIG. 4D, which is a longitudinal cross-section of FIG. 3D, it will be appreciated that the matrix of the overlaminate 26, with any remaining upper web material 13, has been removed. At this point in time, all that remains of the web 13 is what lies under the laminate 26.

Figure 4E:
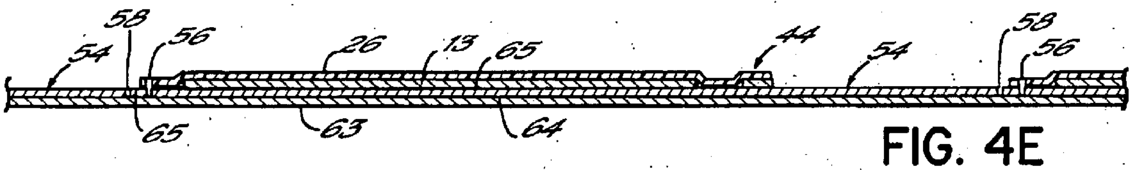

Turning now to FIG. 4E, that is a cross-section longitudinally taken of FIG. 3E, where the base label shape 54 has been cut into the base label layer 65, but before the base label waste matrix is removed. These are illustrated, for example, by the cut lines 56 and 58 for succeeding labels.

Figure 4F:
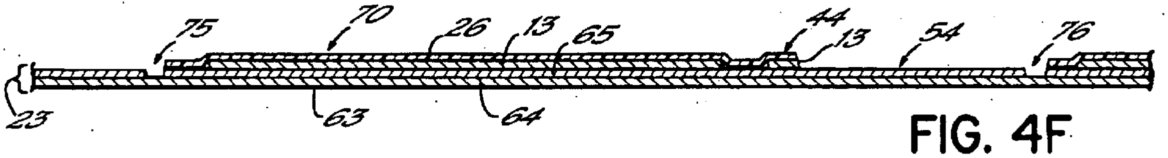

Turning now to FIG. 4F, the matrix 60 comprising the base label layer 65 and carrying with it portions of the overlaminate 26 and upper label web 13, have been removed, leaving only a series of discrete labels on the liner 63. As shown, each of the labels 70 is separated by a small transverse space, such as at 75 and 76 in FIG. 4F.

Turning now to FIGS. 5 and 6, there is illustrated another alternative embodiment of the invention which specifically includes an upper label, itself of numerous layers such as the three layers as shown. Such an upper layer then, disclosed at 78, is comprised of three layers of label material with the hold-down holes 19, 20 and 21 cut in each layer.

This upper label, such as label 78, for example, can be formed by running three discrete webs together, or by taking one web and running it through a plow to form a tri-fold material, with the folded edges longitudinally oriented with respect to the machine direction, as shown in FIG. 1.

It will be appreciated that, in the trimming and cutting of this label, if the folds are left in, they may operate as a hinge, but where the label is wrapped around a cylindrical article, for example, the hinge would not generally be serviceable. Accordingly, it may be useful to orient the label either vertically on a cylinder, so that the fold line lies along a straight, and not a curved, line, or to use the label on a flat surface where a hinge in the layers of the upper label are desired.

FIG. 6 demonstrates what a label supply would look like in cross section, when using the multiple level upper label 78 as shown in FIG. 5. The upper label 78 includes an overlay, or overlaminate 26, just as described above. In this instance, the base labels 54 still underlie the upper layer and are carried on the liner 63, the only difference being a thicker area of the upper label 78, by virtue of its multiple layers. moreover, the tab at 44 is still only composed of the overlaminate and one layer of upper label layer material, the other layers being removed as waste.

Thus, it will be appreciated and, again with reference to FIG. 1, that after the matrix 60 is removed, a plurality of discrete, multiple layer labels is left on the liner 63 to provide a finished label supply, such as illustrated at 80 in FIG. 1.

Looking momentarily at FIG. 2, it will be appreciated that the various die stations 14, 32 and 50 are illustrated as they generally may appear on a press, similar to the Roto Press equipment identified above. It will be appreciated that the press can be threaded in any suitable manner to accommodate the webs as shown.

Turning now to FIGS. 7 and 8, there is shown therein an alternative embodiment of a label structure very similar to that already described, but where the upper label itself is preferably a single layer, taking on some fanciful shape, such as a caricature of a human, as shown in FIGS. 7 and 8.

As shown in FIG. 7, there is an upper label web, such as at 84, provided with transverse openings, such as at 85 and 86, similar to those hold-down openings described above. This web is preferably covered with a clear overlaminate 87 as described above and shown broken away in FIG. 7. Also shown in FIG. 7 in phantom lines, are the outline 88 of what is to be the fanciful shape of the upper label and the outline 89 of what is to be the base label.

The process of providing labels of this shape and design is the same as described above; the various webs are run together with the hold-down openings 85 and 86 providing access of the overlaminate 87 to the base under the openings 85 and 86 to hold the two upper and lower label webs in register.

Turning now to FIG. 8, what is depicted here is the finished label structure. It will be appreciated that this is similar to the label structures described above, as a result of the process illustrated in FIG. 1.

A plurality of finished labels 92 are carried on a liner 93. The finished labels 92 comprise the base label 89 and the upper label 88. The base label 89 comprises a base label layer, provided with adhesive on its backside (not shown) for securing the label 92 to the liner 93 and eventually to an article.

The upper layer 88 comprises an upper label layer in a fanciful design, such as that shown, and covered with a clear overlaminate 87. It will be appreciated that the base label 89 comprises a label layer defined between the lines 95 and 96 at the feet of the design and the line 97 at the neck area of the design. The areas defined at 98 and 99 comprise laminate material 87 overlapping the upper label layer and adhering to the base label 89.

This is also true of the area 100 defined between the forward or leading edge of the upper label layer 97 and the tab 101. The area 100 defines an area of the upper, clear overlaminate which is adhered to the base layer 89 between the lines 97 and the tab 101 defined between the upper curvature of the fanciful figure and the line 102.

the tab 101 is a combination of overlaminate material on the top side and, on the bottom side, a tabbed portion which was die cut and stayed with the overlaminate when the matrix of the overlaminate and the upper label layer were removed in the process as described above. In this way, a final supply of a plurality of discrete labels 92, each comprising a base layer and an upper label layer in fanciful design, are provided. Again, a patterned or full release coat can be provided in the base layer to facilitate label pull-up.

Turning now to FIGS. 9–11, there is disclosed therein another variation of a label which can be easily provided by the process. These figures, in sequence, show the finished label first, then its preliminary stations. In particular, it is sometimes desirable to completely surround the upper label layer with an overlaminate, so that no significant edges of the upper label layer are exposed. This protects those layers from tearing, from moisture and the like.

Accordingly, a final label structure 106 is shown in FIG. 9, where a label supply comprises a plurality of discrete multiple layer labels 106, for example. These comprise a base label layer 107 and an upper label layer which is defined by the lines 108, 109, 110 and 111. An overlaminate 112 overlaps the upper label formed by the cut lines 108–111.

The overlaminate is secured to the base label 107 in an area 114 to provide a hinge along the line 109 for the label. If any release coating is used, it would not appear under the overlaminate in areas such as this when a permanent hinge may be desired. If the upper label was to be fully removable, then a full release coat could be patterned here, as well as along sides of the base label 107. Selvage areas 115 and 116 are provided in the overlaminate 112 which overlap the longitudinal edges 108 and 110 of the upper label layer substantially, onto the base label 107 and with the exception of the very small portions of edges indicated at 117, 118, 122 and 123.

This label as shown in FIG. 9, also has an area at 120 which is secured to the base label layer 107, and a tab 121, manufactured in the same way as heretofore disclosed. Of course, the discrete base labels 107, with discrete upper labels thereon, are carried by liner 113 after the base layer matrix is removed.

Accordingly, it will be appreciated that the upper label layer defined between the lines 108–111 is almost fully enclosed at its edges by the overlaminate 112, with the exception of small edges at the very rear end, such as at lines 117, 118, and at the very forward end, by lines 122, 123.

This label, and the process of making it, is better illustrated in FIGS. 10 and 11, for example, where an upper label layer 124 is provided, having transverse hold-down openings 125, 126, for example, such as those cuts described above. Other transverse cuts may be provided as desired.

The overlaminate 112 is shown in broken away fashion in FIG. 10 for the purposes of illustration.

In addition to the transverse hold-down openings 125 and 126, there are longitudinal hold-down openings 127, 128 cut in layer 124. Thus, it will be appreciated, as the overlaminate 112 is applied over this entire area, it extends through the hold-down openings 125, 126, 127 and 128. This is perhaps better illustrated in FIG. 11 where the overlaminate 112 has been applied over the whole upper label layer 124, as shown.

Thereafter, the various die cutting and matrix removal procedures described above are followed. The upper label layer is defined between the edges 129, 130, 131 and 132 of the various hold-down openings 125–128. It is only at the small spaces between these openings, as illustrated in FIG. 10, that the edge of upper label layer 124 will not be overlapped by the clear overlaminate 112. This is perhaps best seen in FIG. 11.

Nevertheless, the overlaminate 112 is die cut into a shape overlapping the upper label layer. Thereafter, the matrix of the overlaminate and various areas of the upper label layer 124 are removed, and the base label shape, such as indicated by the phantom line 132, 133, for example, is die cut and then that matrix removed, to leave a plurality of labels, such as label 106, including base label 107, in FIG. 9, being carried on the liner 113.

In this manner, a multiple layer label is provided wherein the upper label, and regardless of whether it has one label layer or several label layers, are provided, with the upper label having its edges substantially protected by overlapping of the overlaminate 112. This is true, of course, except for the very small areas indicated by lines 117, 118, 122, 123.

The label is also provided with a tab 121, which is formulated as discussed above, to permit the label to be lifted. In this operation, the overlaminate separates from the base label and allows the upper multiple level label to be lifted away therefrom. It can be hinged thereto, along the trailing edge line 109 (FIG. 9), for example, or totally removed by completely lifting it away.

Turning now to FIGS. 12 and 13, an alternate process is shown for manufacturing a somewhat different multiple level label, but nevertheless having some of the same characteristics and features of the labels and processes described above.

FIG. 12, for example, illustrates the process 140 for manufacturing a plurality of eventually discrete multiple layer labels as will be described. This process differs from the process illustrated at 10 in FIG. 1 by virtue of the fact that overlaminate is not immediately used in the process. Nevertheless, it is obviously necessary to maintain the register of the upper label layers with respect to target areas on the lower label webor carrier.

In this context then, according to the invention, a separate adhesive hold-down strip is used to span the areas between the hold-down openings and the upper label layers and to attach that layer to the base label until the overlaminate is applied.

Accordingly, the process illustrated at 140 is as follows. FIGS. 14–14C illustrate the label construction at the areas indicated.

A supply 141 of upper label layer material or web 142 is fed through a first die station 143 comprising rollers 144, 145, which preferably provide in a label material, a series of transverse hold-down openings, such as openings 146, 147, 148 and 149, which will be referred to as hold-down openings.

Thereafter, a base web 150, preferably comprising a pressure sensitive adhesive web mounted on a liner 151 (FIG. 14C), is joined with the web 142 at the combining station 153. Web 150 is carried over roller 154 while a hold-down strip 155 is unwound from supply 156 and carried under roller 157 (diagrammatically shown in FIG. 12 for clarity, the actual engagement and threading being more like that of FIG. 13).

Accordingly, at this station 153, the two webs 150 and 142 are combined and the hold-down strip or tape 155 is, also applied over the upper surface of the web 142, where it can extend through the openings, such as the hold-down openings 146–149 as they progress downstream, to secure the two webs together.

Thereafter, at die station 160, two rollers 161 and 162 are used to cut the upper web and hold-down tape 155 into an upper label format. After this cutting is performed by means of the rollers which have a series of longitudinal and transverse blades thereon, as illustrated in FIG. 12, the matrix 164 is removed. The matrix 164, of course, comprises a portion of the web material constituting the upper label layer and a portion of the hold-down tape, such as at 165.

These transverse cuts, for example, are illustrated by the lines 166 and 167 in FIG. 14 and by the longitudinal lines 168, 169. This leaves a plurality of discrete upper labels 172 carried on the base label web 150 with the cut-shortened hold-down tape 170 holding what is now the upper labels 172 on the web 150.

Thereafter, and if desired, and it must be appreciated that this is an optional feature and not a necessary one at this point, a supply 175 of clear overlaminate web 176 can be applied to the base web 150 as shown in the drawing at application station 177.

Thereafter, at die station 178 comprising rollers 179, 180, the overlaminate is cut to a desired shape, such as an overlapping format with the label 172. Thereafter, the matrix 180 of overlaminate material can be removed, leaving a plurality of upper labels 183, comprising an upper label layer and an overlaminate, on the label web 150.

Thereafter, at a further die station 184 comprising rollers 185 and 186, the base label is cut into the web 150 and such as shown at 188. Thereafter, the matrix 189, comprising the leftover base label layer, is removed, leaving a plurality of discrete multiple layer labels 190 on the liner 151 and comprising a ready-to-use label supply. The labels 190 include, of course, the base label 188 and the final discrete upper label 183 secured thereto, or to the base, by both the remaining hold-down tape 170 and the overlaminate 176.

As will be further explained, the hold-down tape 155 (shortened tape 170) is provided with a non-adhering longitudinally extending center or internal area. This longitudinal center area of the hold-down tape overlaps the tab 194 formed in the upper label layer, with the tape extending only slightly beyond as indicated by the cut line 166 in FIG. 14. It will be appreciated that the non-adhered area 195 overlaps the tab and thus makes it relatively easy to lift up, so that the upper label can be removed from the base.

Turning now to FIG. 13, there is illustrated the webbing of a press, such as a Roto Press PrimeFlex as discussed with respect to the preferred embodiment of the invention. It will be appreciated that any suitable press could be utilized and that FIG. 13 is simply an illustration of one type of press, such as a Roto Press, might be webbed to carry out the described process, all of which results in a final label supply 196 comprising a plurality of discrete labels 190 on the liner 151.

It will also be appreciated that the base label layer can be provided with release and non-release zones, so as to render the removal of the upper label more easily, while yet facilitating its retention during the manufacturing and handling process.

Also, it will be appreciated that in a slight modification of this embodiment, the holding strip could be aligned to the side of the discrete upper label layer and the tab could be formed in the longitudinal side of that upper label layer, rather than in a leading or trailing edge. This orientation might be preferred, for example, when the label is to be flat mounted, or rather mounted on a flat surface, so that one longitudinal edge of the label could comprise the hinge line, while the other the removal tab. This configuration is not particularly suitable for cylindrical objects, however, since the longitudinal edge of the label would then be wrapped around the cylindrical object, it would then be difficult to operate or to hinge a label along that curved line.

At the same time, placing the tab in a leading or trailing edge of the label with the overlaminate holding the label down at the other end, results in a vertical hold-down area and hinge line, about which the label can be rotated when secured to a cylindrical object.

More particularly, FIGS. 15–19 illustrate various embodiments of this aspect of the invention, made by using a narrow hold-down tape according to the process of FIGS. 12–13.

Figure 15:
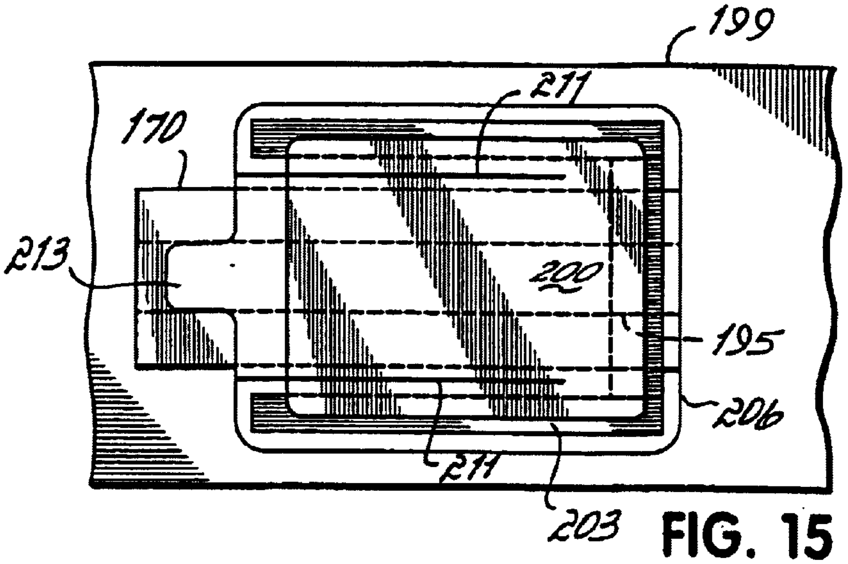
FIGS. 15–19 are plan views of alternative embodiments of a multiple layer label wherein a hold-down tape, substantially narrower than the label, is used to hold the two label webs together during the process.
Figure 16:
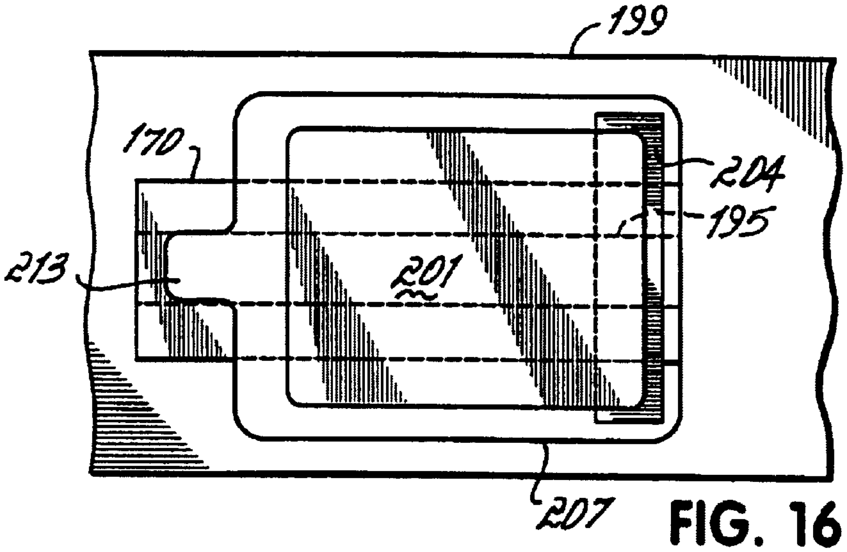

FIG. 15 illustrates various cut lines 211 in the overlaminate and in the upper label layer, which can produce varying results. For example, in FIG. 15, the cut lines 211 extend through both the overlaminate and the upper label layer. Only an internal portion of the label can be lifted. In FIG. 16, there are no internal cut lines but the entire label can be rotated and lifted about a rear hinge line over non-release area 204, with the area surrounding most of the longitudinal sides of the upper label layer being overlapped by the overlaminate, but which engages a release zone so they can be easily removed from the base.

In FIG. 17, again, cut lines 216 are provided in the overlaminate adjacent but outside the longitudinal edges of the upper label layer to make removal easier.

Figure 18:
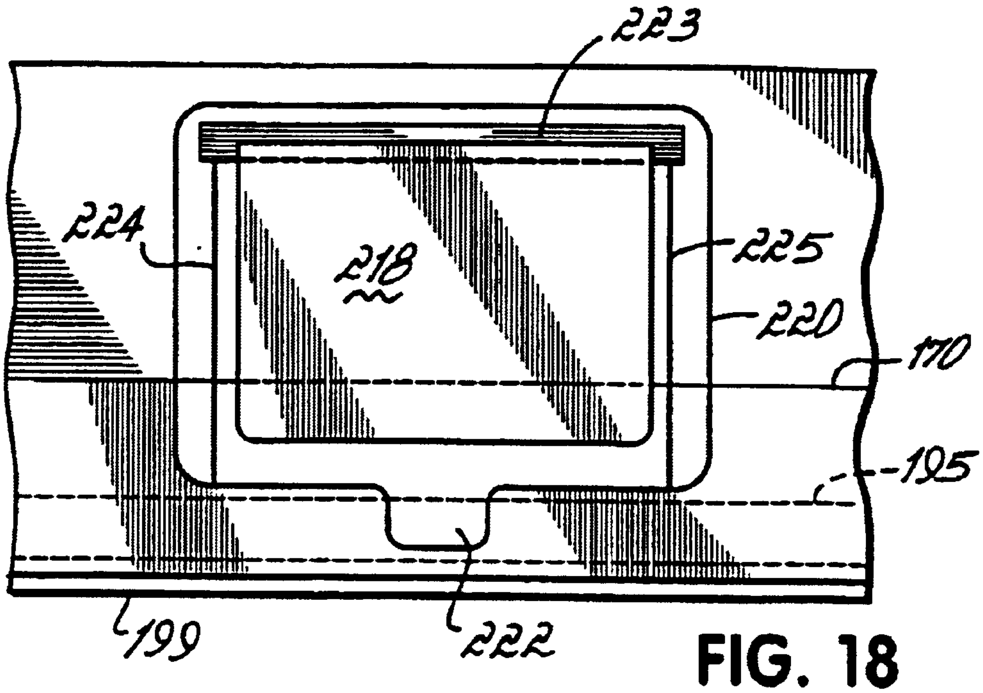
Figure 19:
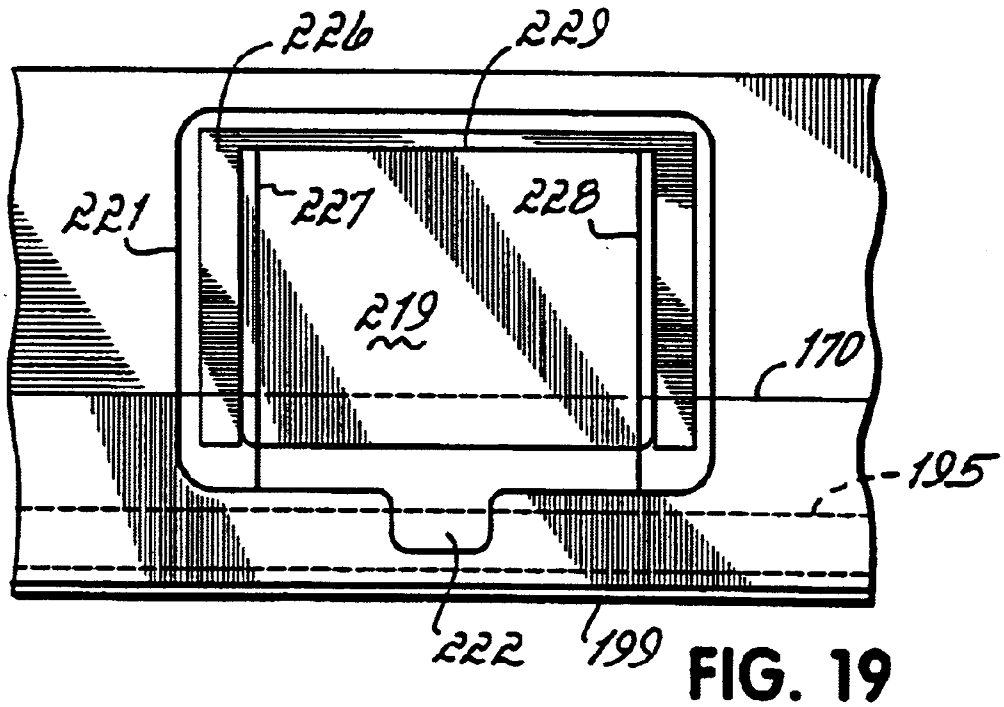

FIGS. 18 and 19 illustrate labels with side tabs and show various cut lines in the overlaminate and/or in the upper label layer. FIG. 18 illustrates a label where the tab is located along the longitudinal side underlying a non-adhesive portion 195 of the holding strip 170 and located in an intermediate longitudinal area of the holding strip 170.

Here, a non-release zone is provided along the adjacent longitudinal label edge, so that the overlaminate provides a hinge and the lifting of the tab can simply lift both the overlaminate and the upper label along the interior parallel cut lines 224, 225 which are transverse to the machine direction.

In FIG. 19, the cut lines 227, 228 are provided interiorly of the upper label layer itself, so that the leading and trailing edges of the upper label are held securely by means of the overlaminate lying in non-release zones 226 and yet a hinge is still provided along the fold line 229, again for a flat mount application.

In more detail and returning to FIGS. 15–17, for example, the upper label levels are shown at 200, 201 and 202, by the shading which is illustrated in those figures. Each is preferably covered on a discrete base label 199 mounted on a liner (not shown) or on a liner itself. The same is true of the structures in FIGS. 18 and 19. The non-release areas of the base level are shown in the shading at 203, 204 and 205 respectively. The extent of the overlaminate is shown by the lines 206, 207 and 208, respectively.

In FIG. 15, interior cut lines 211 and 212 are illustrated, so that the interior upper label and the overlaminate can be lifted and removed by lifting up the tab 213 which underlies the indicated non-adhesive area 195 of the holding strip 170. A holding strip 170 extends longitudinally under the optional overlaminates.

In FIG. 16, the tab 213 can simply be lifted, with the entire label hinging around the area shown at the 204 shading.

Figure 17:
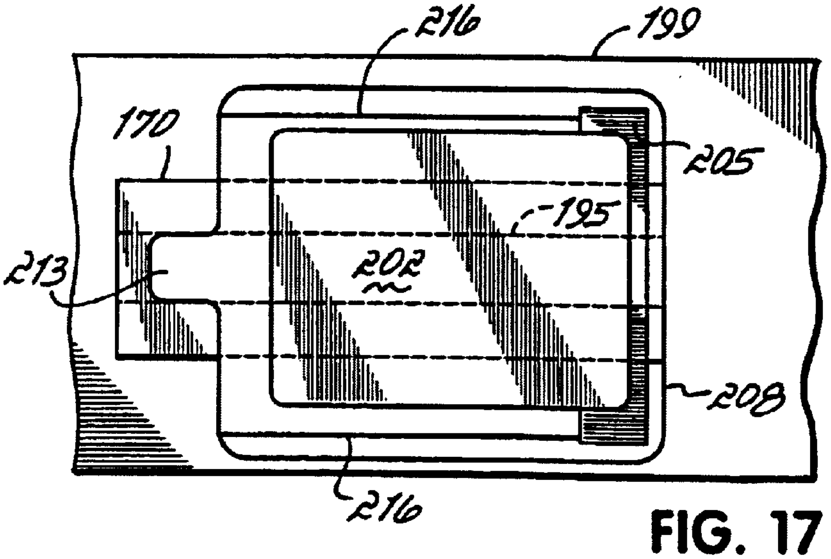

In FIG. 17, interior cut lines 216, 217 are provided to facilitate the removal of the upper label 202 by lifting the tab 213, even though the overlaminate extends throughout areas which do not have a non-release zone. These cut lines may facilitate hinging of the label about the non-release zone 205.

It will be appreciated that like features of these modifications to the label, made according to the process of FIGS. 12 and 13 are indicated with the same numerals.

Turning now to FIGS. 18 and 19, it will be appreciated that the upper labels are represented by the various shadings at 218 and 219, respectively. The outer shape of the overlaminate is shown at the lines 220 and 221 in the respective figures. Each figure has a side tab 222, preferably lying in a non-adhesive zone 195, as shown, of holding strip 170, the non-adhesive zone being located longitudinally throughout an interior portion of the holding strip, with the tab line therein to facilitate removal.

In FIG. 18, a non-release zone is shown in the shading at 223 while the remainder of the overlaminate simply lies in a release area on the base and is even more easily removable by virtue of the cut lines 224 and 225.

In FIG. 19, a non-release zone 226 around three sides of the upper label and a tab 222 of the label in FIG. 19 is grasped for lifting and hinging the label. The overlaminate and the upper label layer can be lifted along the lines 227 and 228 to expose the underside of the label.

Of course, with respect to FIGS. 15–19, it will be appreciated that the upper label 200, 201, 202, 218 or 219 can each be multiple layers themselves, each can be provided in a booklet-like form, or in separate sheets, as all described herein.

Figure 20:
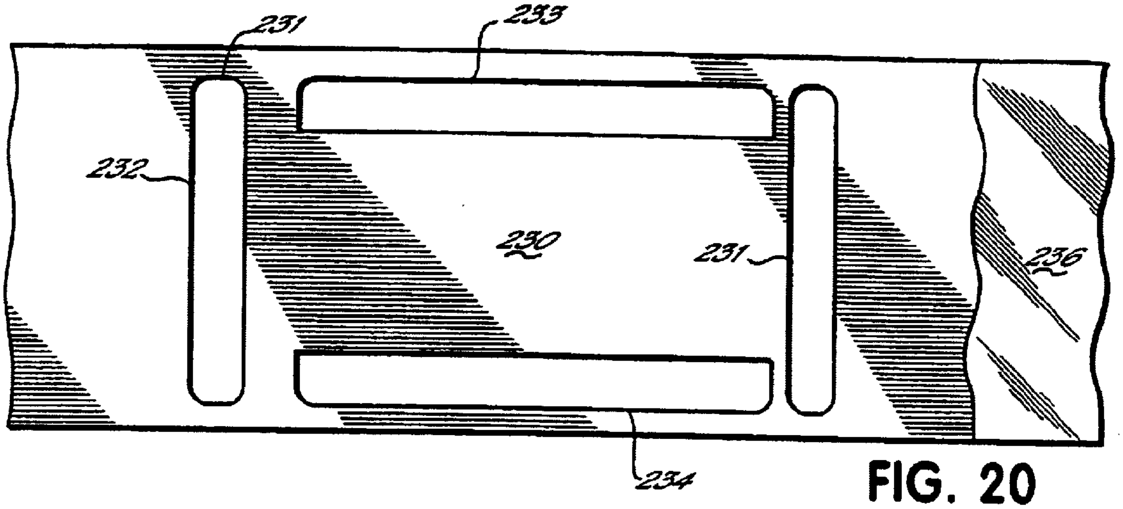
FIG. 20 is a plan view of an alternative first label web set up to produce a label with an overlaminate on a carrier where no base label is used.
Figure 21:
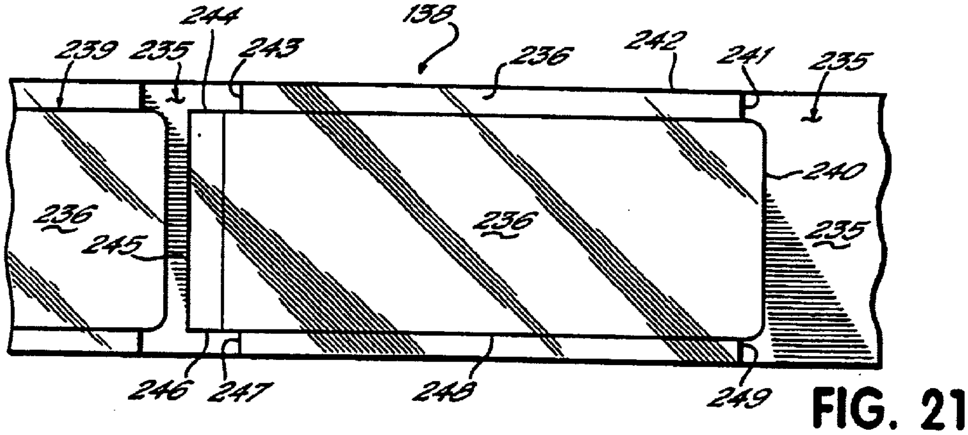
FIG. 21 is a plan view of a label supply as in FIG. 20 where an overlaminate has been added and cut to shape.
Figure 22:
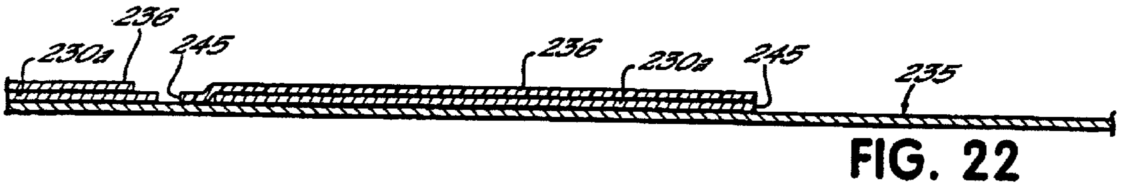
FIG. 22 is a longitudinal cross-sectional view of the label of FIG. 21.

Turning now to FIGS. 20–22, these figures illustrate a modification of a preferred embodiment of the invention wherein it is desirable to provide a supply of releasable labels comprising an upper label and an overlaminate, but where no base label is desired. Such labels could be useful for removal and placing on articles to cover and hold other items, such as separate leaflets, insertions, products, product specimens or the like.

Turning now to FIG. 20, there is shown therein a first upper label web 230 having a plurality of longitudinal and transverse hold-down openings, such as 231, 232, 233, 234. A total sequence of figures similar to those FIGS. 3A–3F, etc., for the preferred embodiment is not shown here since a similar process is used. In this particular case, however, a liner 235 (FIG. 21) is provided as the base. This liner may be a liner which has a pre-coating of silicone or other release material thereon, and which does not carry any base web.

A similar process to that of FIGS. 1 and 2 is used, as shown in the figures in connection with the preferred embodiment of the invention. However, it will be appreciated that since there is no base web, there is no cutting of that base web. Instead, when the first web 230 is combined with the liner 235, an overlaminate such as that indicated at 236 is disposed thereon and extends through the various hold-down openings 231–234 to hold the first web in place on the liner.

Thereafter, at a die station, the overlaminate is cut with a cut extending through any underlying upper label web 230, as shown in FIG. 21. The matrix is removed, leaving a series of upper labels 238, 239 on the liner 235.

In view of the use of both transverse and longitudinal hold-down openings, such as those illustrated in FIGS. 10 and 11, for example, the overlaminate overlaps the upper label formed from the web 230, as shown in FIG. 21. When the final upper label shape is cut, it will be appreciated that the die cuts along the following lines 240–249, thereby defining the upper label on the liner 235.

Shown in cross-section in FIG. 22, this structure includes a plurality of discrete upper labels on the liner 235, with each label having an overlaminate 236, as shown, and an intermediate layer 230A. The overlaminate overlaps the intermediate layer at the end, as shown, and also on the sides as depicted in FIG. 21.

As desired, the liner 235 itself may be provided with a release coating, such as a UV-cured varnish, in the areas underlying the overlapping portions of the overlaminate 236 to facilitate removal of the labels 238 from the liners 235. Upon removal, of course, the labels can be placed on an article and may be conveniently used to capture or contain behind the label an additional leaflet, product, product sample, or the like.

Figure 23:
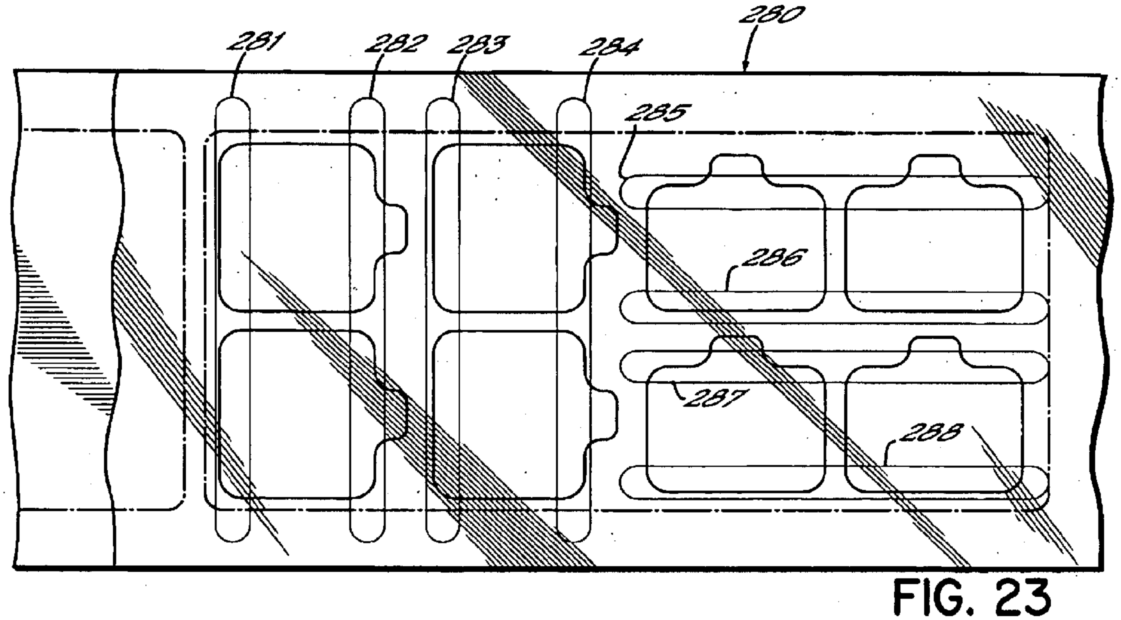
FIG. 23 is a plan view of an alternative first label web wherein a plurality of upper labels are to be carried on each base label.
Figure 24:
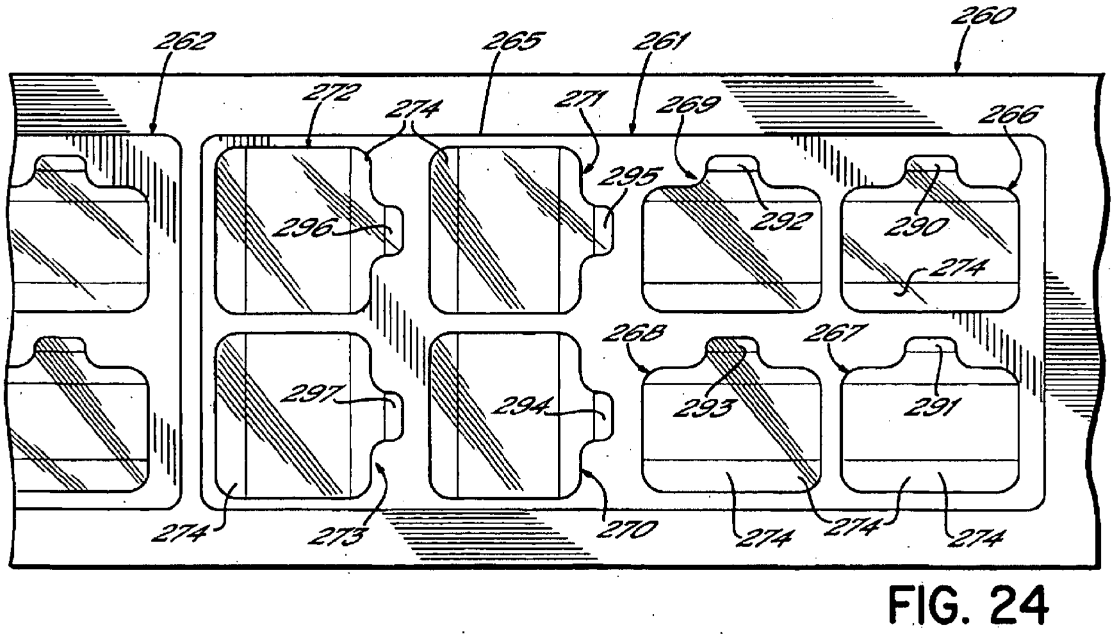
FIG. 24 is a plan view of a plurality of multiple upper labels as suggested by FIG. 23 on discrete base labels.

Turning now to FIGS. 23 and 24, these figures illustrate a further embodiment of the invention wherein a plurality of multiple layer labels are provided in a label supply, such that each base layer has mounted thereon a plurality of upper labels, which are selectively removable therefrom.

Accordingly, in FIG. 24, there is shown a liner 260 carrying a plurality of labels 261, 262 thereon, only label 261 being shown in its complete form for purposes of clarity. In FIG. 24, the label 261 is comprised of a base label 265 carrying a plurality of upper labels 266–273 thereon. It will be appreciated that the labels 266–269 and the labels 270–273 are essentially like those labels shown in the preferred embodiments of FIGS. 1 through 4F, for example. Each comprises an overlaminate 274, for example, overlying an upper label layer, which is shown by the shading in each label.

In the construction of a label supply having such a configuration, reference is best made to FIG. 23, which discloses a first label layer web 280 provided with a plurality of transverse hold-down openings, such as at 281,282, 283 and 284, and a plurality of longitudinal hold-down openings 285, 286, 287 and 288. Eventual upper label shapes are shown in dotted lines. A similar process is described with respect to the preferred embodiment of the invention, as illustrated in FIGS. 1–4F, is shown to make a particular construction shown in FIGS. 23 and 24.

The first label web 280 is combined with a base web (not shown) with an overlaminate 274 applied thereto and extending over the hold-down openings 281–288. Thereafter, a die is applied to cut out the shape of the eventual upper label, as shown in FIG. 24, with the overlaminates 274 extending through what had been the hold-down openings of the web 280 for engagement on the surface of the base labels 261, 262, for example.

Thereafter, of course, another die station cuts out the waste matrix from the base labels, leaving the final multiple layer labels 261, 262 on the liner 260, similar to that as described with respect to FIGS. 1–4F.

It will be appreciated that each of the upper labels 266–273 have tabs thereon, as shown at 290–297. The upper labels 266–269 have tabs directed toward the side or longitudinal edge of the base label 261, while the upper labels 270–273 have forwardly extending tabs 294–297.

Each of these tabs is, itself, a multiple level tab which includes a portion of the overlaminate 274 and an underlying portion of the material of the first web 280, which has been die cut away from what would otherwise be the waste matrix of the first upper label layer web.

Accordingly, it will also be appreciated that portions of the upper surface of the base labels can be provided with a release coat, for example, of UV-cured varnish, in those areas which will correspond to the overlapping of the overlaminate 274 of the upper label layer, thereby rendering the upper labels readily and easily removable from the base label, such as 261.

Reference has been made throughout to overlaminates, hold-down strips or tapes, upper label web or layers, base label layers or base web, liners and release coatings. All these may be of any suitable materials as desired for any particular application. By way of example only, the materials may be as follows:

| | |
|---|---|
| BASE WEB | A three part web comprising base label layer, pressure sensitive adhesive (patterned or full coat) and a release liner or carrier, a product of the Fasson Company, #00347 semigloss, has been found useful. |
| BASE LABEL LAYER | As supplied with base web. Can be paper or synthetic, clear or opaque and can have patterned or full release coating. |
| LINER OR CARRIER | Web of indeterminate length having a suitable release coat to allow the pressure sensitive base labels (or adhesive overlaminate) to be removed. |
| OVERLAMINATE | For example, a 2 mil clear polypropylene film having an adhesive on one side, a product by the Fasson Company known as #74292 polypropylene is useful. |
| HOLD-DOWN TAPE | For example, a one mil clear adhesive tape preferably having a patterned adhesive with a non-adhesive area along an interior portion between elongated patterned adhesives. |

-continued

| | |
|---|---|
| UPPER LABEL | Of one or more layers of paper, synthetic or any suitable label material for the desired application. |
| RELEASE COATING | For example, a UV cured varnish coated or patterned onto a surface and allowing removal of an adhesive component releasably secured thereto. |

Accordingly, it will be appreciated that the invention accomplishes many objectives, including the basic objective of providing a process by which discrete labels can be formed on elongated base webs or liners without losing register of the upper labels, regardless of how many layers, on the base. Numerous variations of shapes and release cuts and patterns are provided and others will be readily appreciated from these description. It will also be appreciated that the processes described herein are useful for producing a stock material from which multiple layer labels can be manufactured, either in pre-printed or partially oriented form.

It will be appreciated that these and other modifications and variations can be made without departing from the scope of the invention, and the applicant intends to be bound only by the claims appended hereto.

What is claimed is:

1. In a process for making a multiple-layer label, the steps of:

providing hold-down openings in a first web defining an upper label layer;

combining said first web with a second web, which second web defines a base label layer; and applying an adhesive overlaminate to said first web, said overlaminate extending over and through said hold-down openings in said first web and securing said first and second webs together, wherein the second web is a composite of a base label material, adhesive and a liner, and including the further step of die cutting said first web and overlaminate into discrete upper labels on said second web.

2. The process of claim 1 including in the die-cutting step, the step of forming edge portions of said upper labels along the edges defining portions of said hold-down openings in said first web, such that the die-cut overlaminate extends over both leading and trailing edges of said die cut upper label in said first web.

3. The process of claim 1 including the further step of removing a combined waste matrix of overlaminate and first web, and leaving discrete upper labels on said second web.

4. The process of claim 3 including the further step of die cutting said second web to form discrete base labels with discrete upper labels on the base labels.

5. The process of claim 4 including the further step of removing a waste matrix of at least said second web to leave a series of base labels, each with a discrete upper label thereon, on said liner.

6. The process of claim 1, wherein the die cutting step includes cutting an upper label shape, including a removal tab shape, in said overlaminate and including a portion of otherwise waste matrix of said first web under a leading end of the tab-shape of said overlaminate to define a multiple layer tab of said overlaminate material of said first web.

7. The process of claim 1 including carrying out said steps in a single pass of the webs through a press.

8. The process of claim 1 including the step of die cutting a plurality of discrete upper labels extending transversely on and across said second web.

9. The process of claim 1 including removing material cut out from the openings in said first web.

10. In a process of forming a multiple layer label, the steps of:

providing hold-down openings in a first web defining an upper layer label;

combining said first web with a second web, which second web defines a base label layer, and applying a hold-down tape to said first web in a disposition overlying said openings;

said hold-down tape securing said two webs together through said openings; and die cutting said first web and said tape and removing a combined waste matrix of portions of said first web and said hold-down tape to leave discrete upper labels held by discrete hold-down tapes on said second web, wherein said hold-down tapes are narrower than the width of said discrete upper labels.

11. The process of claim 10, including the further step of applying an adhesive overlaminate web onto said second web and over said discrete upper labels and hold-down tapes and onto said second web.

12. The process of claim 11 including the further step of die cutting said overlaminate into shapes overlapping at least portions of said discrete upper labels.

13. The process of claim 12 including the further step of removing a waste matrix of overlaminate from around said discrete upper labels.

14. The process of claim 13 wherein said second web includes a composite of base label layer, adhesive and liner, and includes the further step of die cutting said second web to define a series of base labels on said liner, each having an upper label thereon.

15. The process of claim 14 including the further step of removing a waste matrix of said second web to leave a series of base labels on said liner, each carrying an upper label covered by said overlaminate.

16. In a process for making labels, the steps of:

providing hold-down openings in a first web defining an upper label layer;

combining said first web with a second web which is a composite of a base label material, adhesive and liner;

applying an adhesive overlaminate to said first web, said overlaminate extending over and through said hold-down openings in said first web and securing said first web to said second web.

17. The process of claim 16, including the further step of die cutting at least said overlaminate and removing a waste matrix of overlaminate to produce a series of discrete upper labels held on said second web by remaining portions of said overlaminate.

18. The process of claim 17, including the step of die cutting said overlaminate at a leading edge of said upper label so that it is coextensive therewith.

19. In a process of making multiple layer labels, the steps of:

providing a series of transversely extending hold-down openings across and in a first web defining an upper label layer;

providing a series of longitudinally extending hold-down openings in said first web;

said two respective series alternating in disposition on said web;

combining said first web with a second web which is a composite of a base label material adhesive and liner defining a base label layer;

applying an adhesive overlaminate on said first web, said overlaminate extending over said hold-down holes and securing said two webs together through said holes;

cutting a series of upper label shapes in said overlaminate with at least two upper labels being disposed side-by-side transversely across said second web.

20. A process as in claim 19 including the further step of defining tabs in said upper labels with tabs of labels which are substantially defined between said transversely extending hold-down openings being located on a leading edge of such labels and tabs of labels which are substantially defined between longitudinally-extending hold-down openings being located on longitudinal side edges of such labels.

21. A process as in claim 20 including stripping from said structure a waste matrix, leaving a plurality of discrete upper labels on said second web, said overlaminate overlapping at least two respective parallel edges of each upper label layer.

22. A process as in claim 21 wherein the tab defining steps includes cutting a tab-shaped portion of said first web under a portion of said overlaminate, forming each tab such that each tab comprises an overlaminate adhered to a tab portion of said first web to facilitate tab lifting and label removal.

23. The process of claim 21 wherein said second web comprises a base label layer adhered to a liner, and further including the step of die cutting said base label layer of said second web and stripping therefrom a waste matrix of said base label layer to leave a series of base labels on said liner with each base label carrying a plurality of upper labels thereon.

24. The process of claim 1 wherein in the first and second webs are combined before the adhesive overlaminate is applied to said first web.

25. The process of claim 1 wherein the overlaminate is applied to said first web before the first and second webs are combined.

26. The process of claim 6 including forming the tabs extending from a portion of the upper labels other than a leading edge thereof.

27. The process of claim 6 including forming said tabs of both overlaminate and a portion of otherwise waste matrix such that said tabs are secured to upper labels by overlaminate material disposed between said upper label and said tab.

28. The process of claim 10 wherein the first and second webs are combined before said tape is applied to said first web.

29. The process of claim 10 wherein said tape is applied to said first web before said first web is combined with said second web.

30. A process as in claim 16 wherein said overlaminate is applied to said first web before said first and second webs are combined.

31. A process as in claim 16 wherein said first and second webs are combined before said overlaminate is applied to said first web.

32. A process as in claim 17 including the further step of forming tabs extending respectively from and edge of said upper labels.

33. A process as in claim 32 wherein said tab is formed with one portion comprising only overlaminate and a second portion comprising both overlaminate and a reinforcing layer.

34. A process as in claim 19 wherein said overlaminate is applied to said first web before said first and second webs are combined.

35. A process as in claim 19 wherein said first and second webs are combined before said overlaminate is applied to said first web.

36. A process as in claim 22 wherein said tabs are formed with a reinforced portion and a portion consisting of said overlaminate, and wherein said tab is secured to said label by an overlaminate portion extending between the label and the tab.

37. In a process for making a multiple-layer label, the steps of;

providing hold-down openings in a first upper label element;

combining said upper label element with a web element which web element is a composite of base label material, adhesive and an elongated liner and which defines in part a base label layer; and applying an adhesive overlaminate to said upper label element, said overlaminate extending over and through said hold-down openings in said upper label element and securing said first upper label element and said web element together.

38. In a process of forming a multiple layer label, the steps of:

providing hold-down openings in an upper label element defining an upper layer label;

combining said upper label element with a second web which web defines a base label layer, and applying a hold-down tape to said upper label element in a disposition overlying said openings;

said hold-down tape securing said upper label element and said web together through said opening; and die cutting said upper label element and said tape and removing a combined waste matrix of portions of said upper label element and said hold-down tape to leave discrete upper labels held by discrete hold-down tapes on said web, wherein said hold-down tapes are narrower than the width of said discrete upper labels.

39. In a process for making labels, the steps of:

providing hold-down openings in an upper label element defining an upper label layer;

combining said upper label element with a carrier web which is a composite of label material, adhesive and a liner;

applying an adhesive overlaminate to said upper label element, said overlaminate extending over and through said hold-down openings in said upper label element securing said upper label element to said carrier web.

40. In a process of making multiple layer labels, the steps of:

providing a series of transversely extending hold-down openings across and in an upper label element defining an upper label layer;

providing a series of longitudinally extending hold-down openings in said upper label element;

said two respective series alternating in disposition on said element;

combining said upper label element with a web which is a composite of label material, adhesive and a liner and defining in part a base label layer;

applying an adhesive overlaminate on said upper label element, said overlaminate extending over said hold-down holes and securing said upper label element to said web through said holes;

cutting a series of upper label shapes in said overlaminate with at least two upper labels being disposed side-by-side transversely across said web.

* * * * *